US007659891B2

(12) United States Patent
Mackenzie

(10) Patent No.: US 7,659,891 B2
(45) Date of Patent: Feb. 9, 2010

(54) ASSOCIATING ELECTRONIC DOCUMENTS, AND APPARATUS, METHODS AND SOFTWARE RELATING TO SUCH ACTIVITIES

(75) Inventor: Andrew Mackenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 11/045,440

(22) Filed: Jan. 31, 2005

(65) Prior Publication Data

US 2005/0188306 A1 Aug. 25, 2005

(30) Foreign Application Priority Data

Jan. 30, 2004 (GB) ................................. 0402022.8
Apr. 23, 2004 (GB) ................................. 0409070.0

(51) Int. Cl.
*G06F 3/033* (2006.01)

(52) U.S. Cl. ...................................... 345/179; 345/156

(58) Field of Classification Search ......... 345/179–183; 178/18.01, 18.03, 19; 715/512, 263, 200; 382/306, 179, 184, 187
See application file for complete search history.

(56) References Cited

U.S. PATENT DOCUMENTS

| 5,313,572 | A | * | 5/1994 | Yamamoto et al. | ........... 382/306 |
| 5,950,207 | A | | 9/1999 | Mortimore | |
| 6,081,261 | A | * | 6/2000 | Wolff et al. | ................. 345/179 |
| 6,108,656 | A | | 8/2000 | Durst | |
| 6,766,494 | B1 | * | 7/2004 | Price et al. | ................... 715/203 |
| 7,415,667 | B2 | * | 8/2008 | Rhodes | ....................... 715/263 |
| 2003/0033319 | A1 | | 2/2003 | Van Der | |
| 2003/0093384 | A1 | | 5/2003 | Durst et al. | |
| 2005/0091578 | A1 | * | 4/2005 | Madan et al. | ................ 715/512 |

FOREIGN PATENT DOCUMENTS

| EP | 0 805 410 A3 | 11/1997 |
| EP | 1058196 A | 6/2000 |
| EP | 1054335 A | 11/2000 |
| EP | 1 398 711 A1 | 3/2004 |
| GB | 0 229 547 | 2/1925 |
| GB | 2 334 799 A | 9/1999 |
| GB | 2 334 800 A | 9/1999 |
| GB | 2 384 067 A | 7/2003 |
| WO | 98/51036 | 5/1998 |
| WO | 01/26032 | 4/2001 |

OTHER PUBLICATIONS

EP Search Report, Sep. 27, 2006, Hewlett-Packard.
Johnson, W. et al., "Bridging the Paper and Electronic Worlds: The Paper User Interface", Association for Computing Machinery, ACM, Apr. 1993.

(Continued)

*Primary Examiner*—Kevin M Nguyen

(57) ABSTRACT

A method of associating a first electronic document with a second electronic document comprising having a first physical paper identifier (130) having pen-readable coding (12) which codes for an identifier for the first electronic document, and reading the coding of the first electronic document with a pen (20) to acquire information enabling the identity of the first electronic document to be established, and communicating that identity to a computer processor (107), and using the processor (107) to associate the identified first electronic document with the second electronic document.

28 Claims, 31 Drawing Sheets

OTHER PUBLICATIONS

Rekimoto, J. et al., "CyberCode: Designing Augmented Reality Environment with Visual Tags", Sony Computer Science Laboratories, 2000.

Baldonado, M. et al., "Notable: At the Intersection of Annotations and Handheld Technology", Lecture Notes in Computer Science, Sep. 2000.

Jaeger, S. et al., "The Callpaper Concept: Turning Paper into Computer Terminals", IEEE ICDAR'03, Aug. 2003.

Roscheisen, M. et al., "Beyond Browsing: Shared Comments, SOAPs, Trails, and On-Line Communities", Computer Networks and ISDN Systems, Apr. 2005.

"Distributing Uniform Resource Locators as Bar Code Images", IBM Technical Disclosure Bulletin, vol. 39, No. 1, Jan. 1996.

* cited by examiner

AGENDA

1. Minutes of the last meeting

2. Office Expansion

3. New Markets

4. Recruitment

5. AOB

— 12

— 130

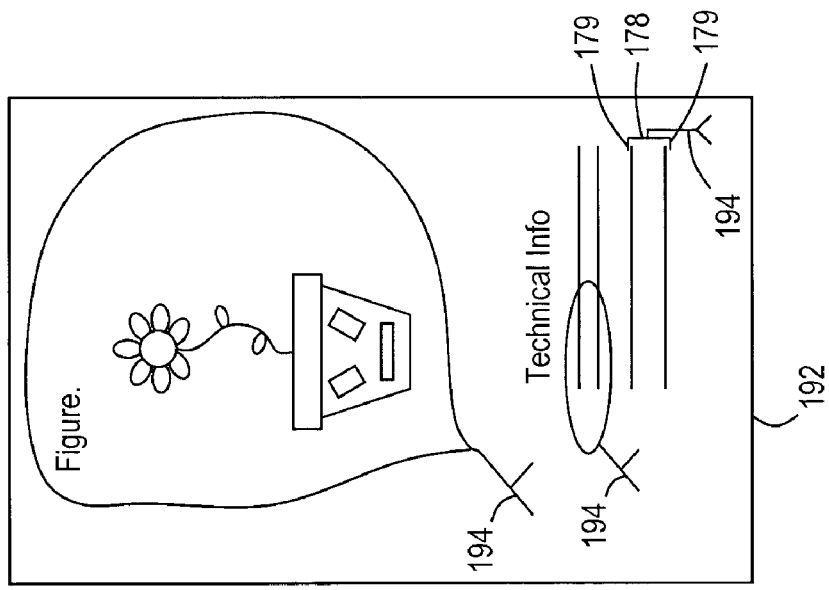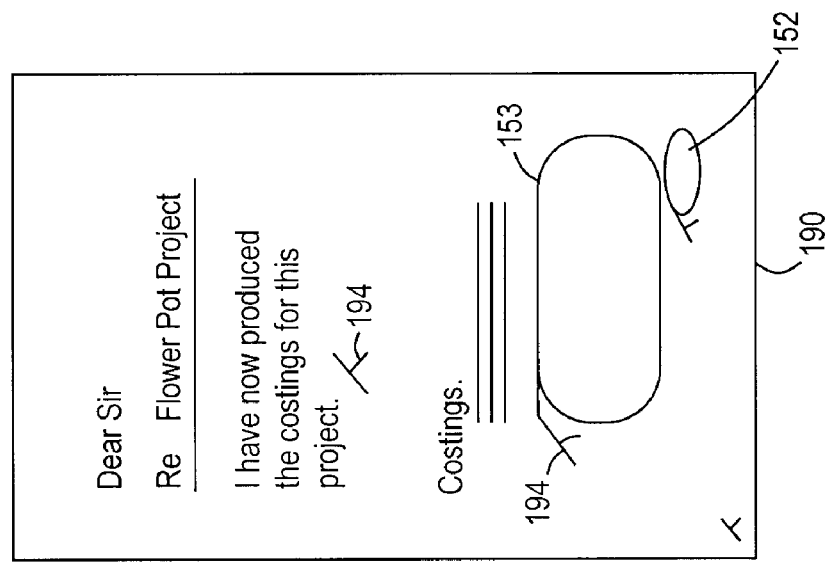
*Fig. 17*

Dear Sir

Re    Flower Pot Project

I have now produced
the costings for this
project. I have also produced
a new design (see figure)

Costings.
_____
_____
_____

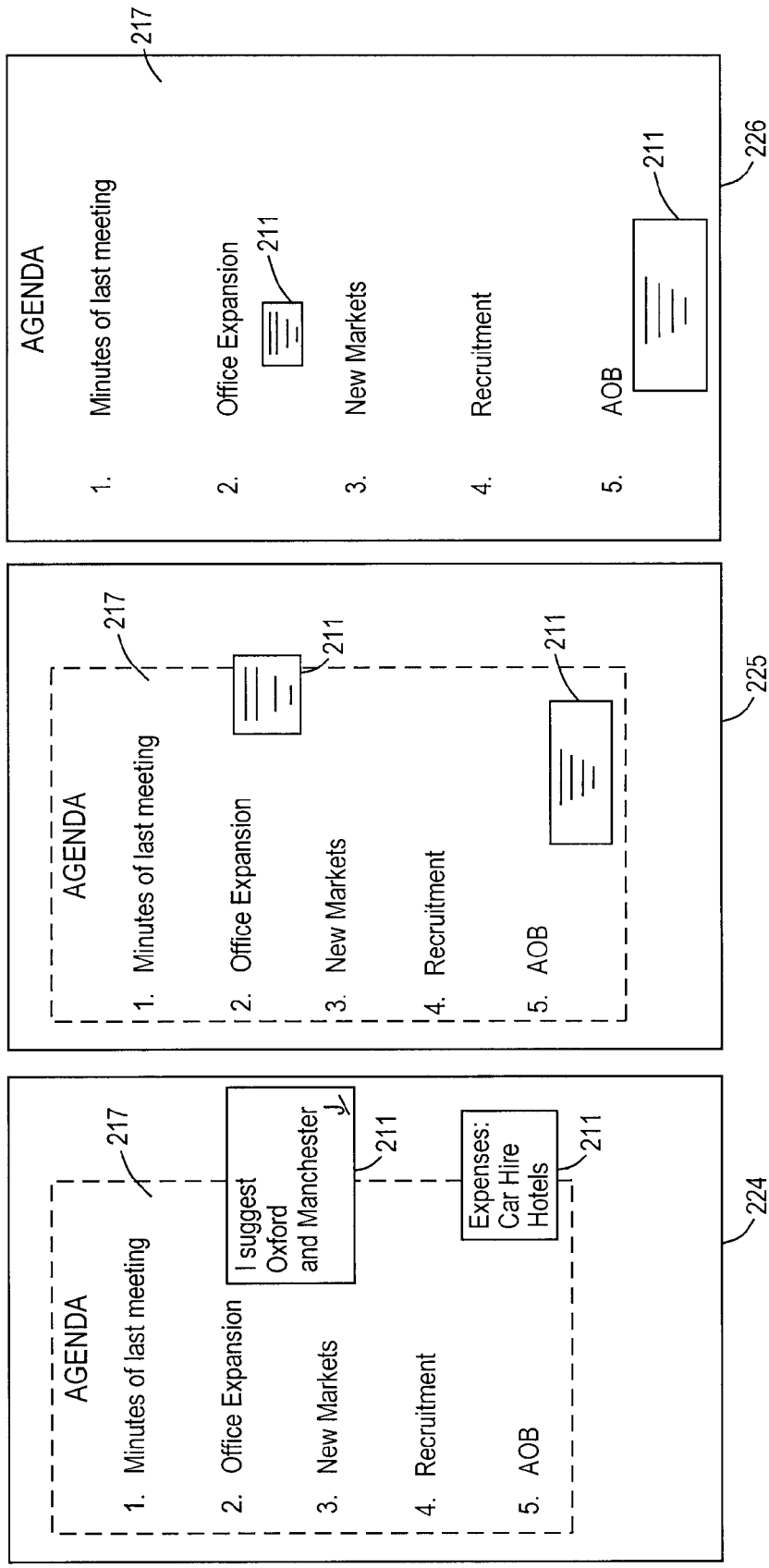

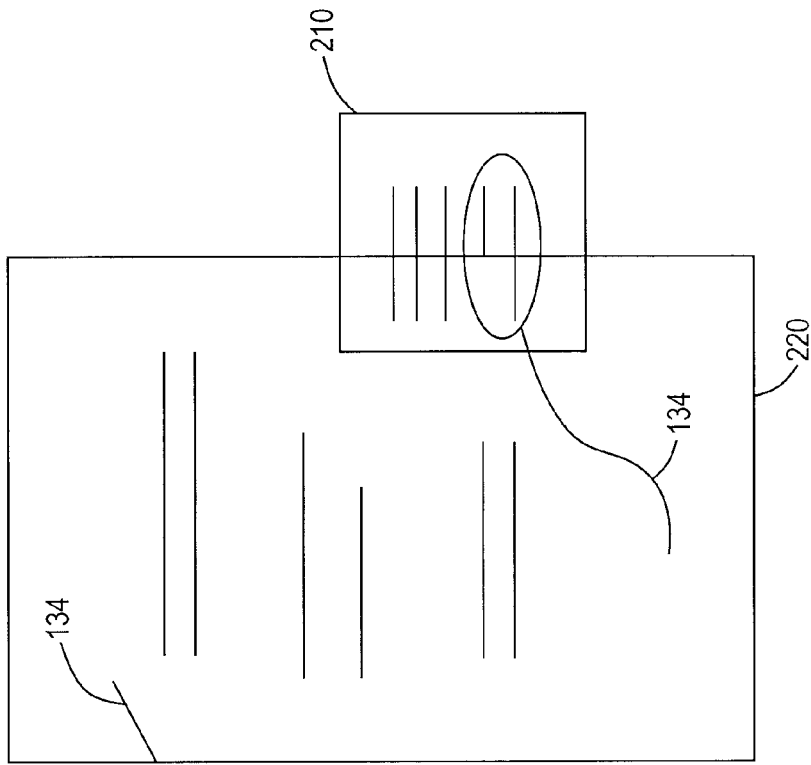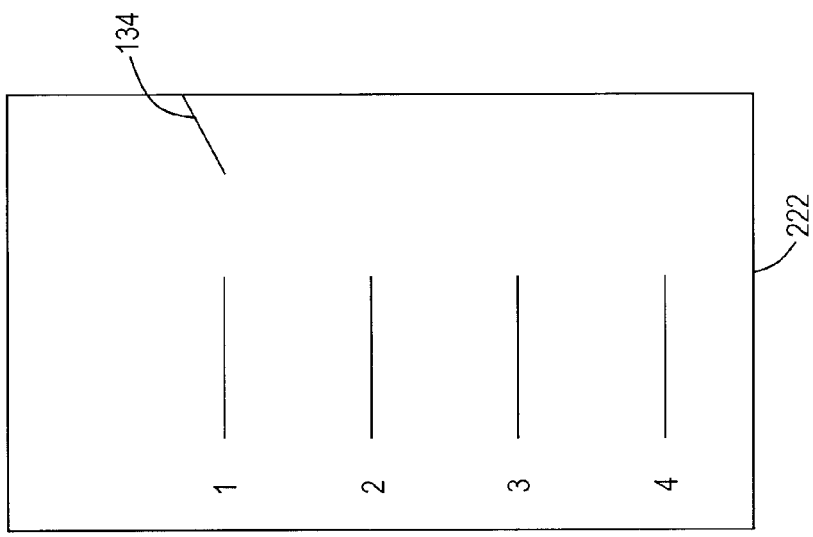
*Fig. 23*

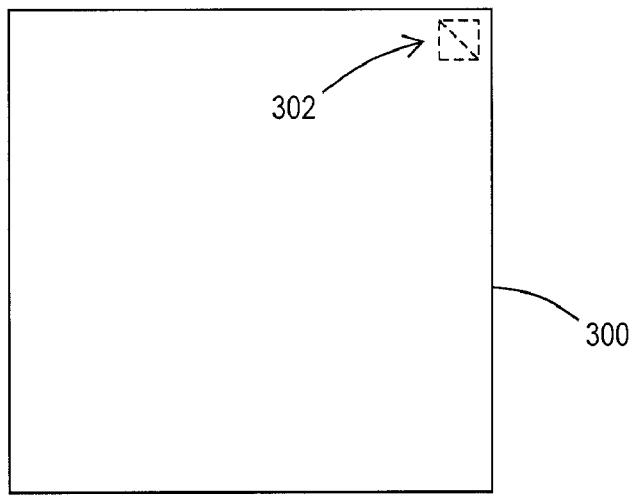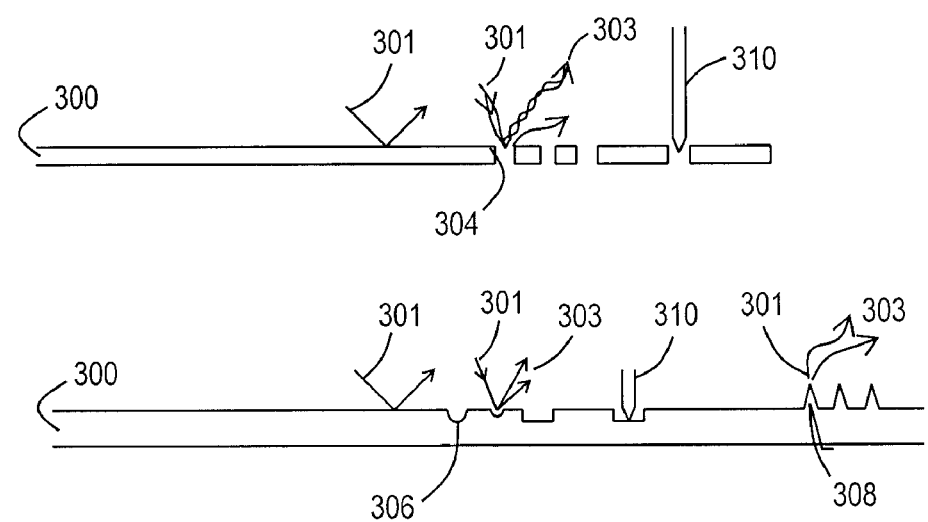
Fig.31

ASSOCIATING ELECTRONIC DOCUMENTS, AND APPARATUS, METHODS AND SOFTWARE RELATING TO SUCH ACTIVITIES

FIELD OF THE INVENTION

This invention relates to associating electronic documents, typically previously unassociated electronic documents, and apparatus, methods and software relating to such activities.

BACKGROUND OF THE INVENTION

In modern times a large number of documents that are produced are generated and stored on a computer, that is, the documents are at least initially 'electronic documents'. Usually, the electronic documents are printed out so that a hard copy of the document is obtained. Sometimes a document is sent to a recipient electronically, for example as an attachment to an email, and the recipient may store the document on their computer and/or print out a copy of the document.

Many people prefer to print out electronic documents because, for example, they prefer to read from a printed document rather than from a computer screen. Annotations can easily be made to a printed document with a pen and the hand written annotations will be clearly distinguishable from the original document.

A user, typically in a work environment but not necessarily so, may come to the end of their session on their PC, possibly because it is time to go home, and still have documents to read and/or amend. They know they will have some time later, for example at home or whilst commuting (e.g. on the train), when they can work on the documents. They print out the documents, and take the printed paper versions with them to amend using a pen later. When they get back to their PC at work the next morning they take out their paper copies of the documents and cell up the electronic versions on their PC's screen and type in the changes. Alternatively, they give the final amended documents to their secretary for them to type in the changes.

When working with printed documents, various different documents can be physically associated with each other, for example the printed documents may be attached to each other by stapling the documents together or using a paperclip or bulldog clip or the like to hold the documents together. Various different printed documents may also be associated with each other by placing them in a folder or sleeve. Also adhesive notelets such as Post-it™ notes can be used to attach handwritten notes to printed documents.

When working with electronic documents, documents of the same type may be associated with each other by storing them in the same electronic folder or directory. Some software packages, e.g. WinZip™ or Microsoft™ Binder, exist that associate documents so that the documents can be stored together in a computer memory or distributed together (e.g. by email).

PRIOR ART

The invention arose out of a consideration of the work of Anoto Group AB and others in relation to digital pattern paper and digital pens. It is convenient to discuss the invention in that contextual background, but it will be appreciated that the invention is not restricted to use with any proprietary system.

The prior art Anoto digital pen and paper system is described on their website www.anotofunctionality.com. However, since the content of websites can change with time it is to be made clear that the prior art admitted is that which was published on their website no later than the day before the priority date of this patent application. It is also appropriate to include in this application itself a brief review of the Anoto system.

FIG. 1 shows schematically an A4 sheet 10 of Anoto digital paper. This comprises a part of a very large non-repeating pattern 12 of dots 14. The overall pattern is large enough to cover 60,000,000 square kilometres. The pattern 12 is made from the dots which are printed using infra-red absorbing black ink. The dots 14 are spaced by a nominal spacing of 300 µm, but are offset from their nominal position a little way (about 50 µm), for example north, south, east or west, from the nominal position.

In WO 01/126032, a 4×4 array of dots is described, and also a 6×6 array of dots, to define a cell. Each cell has its dots at a unique combination of positions in the pattern space so as to locate the cell in the pattern space. The dot pattern of an area of the dot pattern space codes for the position of that area in the overall dot pattern space. The contents of WO 01/126032 are hereby incorporated by reference, with special reference on the dot pattern and the pen.

The sheet 12 has a pale grey appearance due to the dots 14.

FIG. 2 schematically shows a digital pen 20 adapted to write human readable ink in non-machine-readable IR transparent ink and to read a position dot pattern in infra-red. The pen 20 has a housing 22, a processor 24 with access to a memory 26, a removable and replaceable ink nib and cartridge unit 28, a pressure sensor 29 adapted to be able to identify when the nib is pressed against a document, an infrared LED emitter 30 adapted to emit infra-red light, an infrared sensitive camera 32 (e.g. a CCD or CMOS sensor), a wireless telecommunications transceiver 34, and a removable and replaceable battery 36. The pen 20 also has a visible wavelength warning light 38 (e.g. a red light) positioned so that a user of the pen can see it when they are using the pen, and a vibration unit 40 adapted to vibrate and to cause a user to be able to feel vibrations through the pen.

Such a pen exists today and is available from Anoto as the Logitech IO™ pen.

The pen, when in use writing on a page/marking a page, sees a 6×6 array of dots 14 and its processor 24 establishes its position in the dot pattern from that image. In use the LED 30 emits infra-red light which is reflected by the page 12 and detected by the camera 32. The dots 14 absorb the infra-red and so are detectable against the generally reflective background. Of course, the ink of the dots might be especially reflective in order to distinguish them (and the paper less reflective), or they may fluoresce at a different wavelength from the radiation that excites them, the fluorescent wavelength being detected. The dots 14 are detectable against the background page.

The processor 24 processes data acquired by the camera 32 and the transceiver 34 communicates processed information from the processor 24 to a remote complementary transceiver (e.g. to a receiver linked to a PC). Typically that information will include information related to where in the dot pattern the pen is, or has been, and its pattern of movement.

There are times when the processor 24 cannot determine its position in pattern space (the overall virtual space defined by the very large dot pattern). For example, if the pen is moved too fast over the pattern the processor cannot process the images fast enough. Also the pen may not be able to see where it is in the dot pattern. This can happen if the page 14 is marked or defaced by colorants, or the pattern covered up with something, or the field of view of the pattern is obscured. The user putting their finger in the way is a common reason why the processor fails to recognise the position of the pen. In order to alert the user to the fact that the pen is not able to determine its position properly the processor 24 is adapted to illuminate the light 38 and cause the vibrator 40 to vibrate. The user gets visual and tactile feedback that the camera is not seeing the dot pattern properly/that the pen is unable to determine its position properly.

3M market software (Post-it™ Software Notes 3.0) that provides an electronic equivalent to paper Post-it™ notes. The prior art 3M software is described on their website (www.3m.com). However, since the content of websites can change with time it is to be made clear that the prior art admitted is that which was published on their website no later than the day before the priority date of this patent application. It is also appropriate to include in this application itself a brief review of the 3M software.

The 3M software allows an electronic version of a Post-it note™ to be produced and "stuck" (i.e. be displayed) on the computer desktop. These electronic Post-it notes™ can be dragged from a desktop to a memo board for easy organisation of the notes or the notes can be attached to documents such as Microsoft™ Word documents. Electronic handwritten notes can be produced on a Tablet PC or other pen enabled PC.

A proposed use of Anoto functionality is the use of sticker notelets (e.g. like conventional paper Post-it notes™) that have been printed with a dot pattern: a picture of a Post-it note™ appears on the user's computer screen with the user applied handwriting on it.

SUMMARY OF INVENTION

According to a first aspect of the invention, a method of associating a first electronic document with a second electronic document is provided comprising having a first physical paper identifier having a device readable coding, which codes for an identifier for said first electronic document, and reading said coding of said first electronic document with a device, to acquire information enabling said identity of said first electronic document to be established, and communicating that identity to a computer processor, and using said processor to associate said identified first electronic document with said second electronic document.

According to a second aspect of the invention, a system is provided for presenting to a user a visual representation of a combined document including at least some user readable content from a first paper document and at least some user readable content from a second paper document, said system comprising:
  a digital document linking device, said device having a position determining device adapted to acquire information to enable said position of said device to be determined, said position determining device being one of a position determining sensor and a camera;
  a first paper sheet having a first device-readable pattern to enable said device to acquire information from said first paper sheet to enable said position of said device in said first pattern to be determined;
  a second paper sheet comprising a paper document having a second device readable pattern to enable said device to acquire information from said second paper sheet to enable said position of said device in said second pattern to be determined, and there being an electronic equivalent document equivalent to said content of said second paper sheet;
  a computer processor adapted to process signals from said device;
  a communications link adapted to communicate said pen or device with said processor to enable said signals to be communicated to said processor, said signals including device acquired data capable of enabling said position of said device in said patterns to be identified;

and wherein:
  said processor has software which when run is adapted to:—
  identify said second electronic document equivalent to said content of said second document using second pattern-related data acquired by said device:—
  to create a first electronic document representative of user-applied device movements, made on said first paper sheet when said user creates a first, written paper document on said first paper sheet;
  to interpret data derived from device movements performed by said user on said first and second paper sheets as linking instructions to create a link between said second electronic document and said first electronic document so as to enable a visual representation to be produced of said second paper document with said device created first paper document associated with it; and
  to act on said linking instructions so as to cause said first and second electronic documents to be so linked.

According to a third aspect of the invention, a system is provided for presenting to a user a visual representation of a combined document including at least some user readable content from a first paper document and at least some user readable content from a second paper document, said system comprising:
  reading means for reading a first and second device-readable position-determining patterns on said first and second paper documents respectively to identify said position of said reading means on said paper documents, said reading means having a lighting means adapted to shine light onto said paper documents, a light receiving means adapted to receive light from said lighting means that has been reflected off said paper documents so as to acquire information to enable said position of said writing means on said paper documents to be determined, and a pressure sensing means, said reading means being adapted to acquire said information and determine when said pressure sensing means senses a reading pressure applied to said documents by reading means;
  a processing means adapted to process signals from said reading means;
  a communication means adapted to communicate said reading means with said processor to enable said signals to be communicated to said processing means, said signals including device-acquired data capable of enabling said position of said device in said patterns to be identified;
  an electronic equivalent to said user readable content of said second paper document, said electronic equivalent document being stored in memory accessible by said processor;

and wherein:
  said processing means has software means which when run is adapted to:—
  identify said second electronic document equivalent to said content of said second document using second pattern-related data acquired by said device:—
  create a first electronic document representative of user-applied device movements made by said reading means on said first paper sheet when said user creates a first, written, paper document on said first paper sheet;

to interpret data derived from said movements made by said user in which said reading means first reads one of said first digital device-readable pattern and said second digital device-readable pattern, and then reads said other one of said first digital pen-readable pattern and said second digital pen-readable pattern, whilst maintaining said reading pressure on said pressure sensing means, as linking instructions to create a link between said second electronic document and said first electronic document so as to enable a visual representation to be produced of said second paper document with said device-created first paper document associated with it; and to act on said linking instructions so as to cause said first and second electronic documents to be so linked.

In a fourth aspect of the invention, a software is provided for associating a first electronic document with a second electronic document, wherein a first physical paper identifier having device-readable coding codes for an identifier for said first electronic document, said software when run being adapted to:— identify said first electronic document from coding acquired by a device; and associate said identified first electronic document with said second electronic document.

According to a first preferred embodiment there is provided a method of associating a first electronic document with a second electronic document comprising having a first physical paper identifier having pen-readable coding, or other device-readable coding, which codes for an identifier for the first electronic document, and reading the coding of the first electronic document with a pen, or other device, to acquire information enabling the identity of the first electronic document to be established, and communicating that identity to a computer processor, and using the processor to associate the identified first electronic document with the second electronic document.

The first physical paper identifier may have a machine/pen readable code coding for the first electronic document and not all, some, a little, or no, or substantially no, human-readable content printed, written, or marked on it equivalent to, or the same as, the electronic human-readable content of the first electronic document (when that electronic document is displayed to a user).

The digital pen, or other device, may be used to read a second physical paper identifier coding for the second electronic document and to communicate to the processor information enabling the identity of the second electronic document to be established. Alternatively, or additionally, there may be an existing electronic document being worked upon by a user, comprising the second electronic document, and the pen, or device, may be used to add content, or links to content, to the existing electronic document by its interaction with the first physical paper identifier.

The digital pen, or other device, may be used to create human discernable content of at least one of the first and second electronic documents. For example, the user may handwrite notes and/or draw sketches on the first physical paper identifier, and/or the second physical paper identifier (if provided).

The first and/or second physical identifier may comprise a printed and/or digital pen-written paper document having human discernable content equivalent to at least part of the first and/or second electronic document respectively. The first and/or second document and the equivalent first and/or second electronic documents whose identity is coded for by their pen-readable coding, or other device-readable coding, may have substantially the same written and/or graphic human readable content as each other. The first and/or second physical paper document and their equivalent electronic documents may present substantially identical representatives of their human readable content to a user in a What You See is What You Get manner. At least one of the electronic documents, and optionally both, may faithfully replicate a paper document created at least in part by a user making markings with the digital pen, or other device, on digital paper, comprising at least one of the paper documents. The physical paper identifier may have a pen, or device, position determining pattern on it to enable the pen, or other device, to acquire data to enable the position of the pen, or device, on the paper to be determined, and to enable pen strokes, or device movements, on the paper to be represented in an equivalent digital document. Other ways of achieving the digital capture of pen strokes or device movements may be used.

The first physical paper identifier may comprise a first sheet of digital paper having a digital pen, or other device, readable position-determining pattern and having human readable content; the second physical paper identifier comprises one or more sheets of digital paper having a digital pen, or other device, readable position-determining pattern; and wherein the user may associate an electronic document identified by the first sheet of paper with a specific region a human discernable representation of the second electronic document by using the digital pen, or device, to link the first electronic document to said specific region by making a linking marker gesture with said pen, or device, on the or a said second sheet of paper at a position on the or a said second sheet of paper equivalent to said specific region.

A user may make a linking marker or gesture on at least one, or more than one, physical paper identifier of the document, the mark or gesture being interpreted by the processor as instructions to link electronic documents identified by the pen, or other device.

The physical paper identifiers may include a physical paper print-out of at least one of the electronic documents identified by the paper identifier.

The user may:

(i) write notes and/or sketches on notelets comprising a plurality of said first sheets of paper using a digital pen, or other device, to create content on said first sheets, and to create a plurality of first electronic documents equivalent to notelet content;

(ii) position the plurality of notelets on said second sheets of paper at places where it is desired for the content of the first sheets of paper to be reproduced in a representation of an electronic combined document formed from an electronic document equivalent to and identified by said several sheets and from said first electronic documents created by said pen, or other device, upon said notelets;

(iii) use the digital pen, or other device, to make link marks or gestures on each notelet and the adjacent area on the second document so as to link said plurality of first electronic documents with said second electronic document to create a combined electronic document such that the notelet contents appear to a user viewing the combined electronic document at the positions where the link marks or gestures are made.

The first physical paper identifier may have content equivalent to the content of said first electronic document, and a first sheet of paper may comprise the first physical paper identifier and a second sheet of paper may comprise a second physical paper identifier having content equivalent to the content of a second electronic document, and the first and second electronic documents may be linked by writing a line, or making a pen or other device gesture, that extends from one sheet of paper to the other.

A link may be caused to be established between the first electronic document and the second electronic document by:
(i) making a specific predetermined gesture or mark with said pen or other device on at least one of the said first physical paper identifier and a second physical paper identifier which has a pen-readable code, or device-readable code, coding for said second electronic document; or
(ii) making a non-specific undefined gesture or mark with said pen or other device on at least one of said first physical paper identifier or a second physical paper identifier which has a pen-readable, or device-readable, code coding for said electronic document.

The coding may comprise at least one of:—
(i) a pattern of markings or dots from which a page identity can be established;
(ii) a pattern of markings or dots from which a position in a marking or dot pattern can be established;
(iii) a radio frequency marker;
(iv) an ultraviolet marker;
(v) a marker detectable at an electromagnetic wave spectrum that penetrates paper well.

The second electronic document may be associated with the electronic document in a manner such that when a combined, associated, electronic document, comprising said first and second electronic documents, is displayed the first and second electronic documents are presented to a user as separate/identifiable documents each retaining their integrity unadulterated by the other. For example the combined electronic document when displayed to a user may present the first and second documents in a manner from the group:—
(i) one after the other, as equivalent paper pages containing the content of the electronic documents had as if the paper pages been stacked on top of each other (one document below the other);
(ii) as options in a user-selectable menu, with options relating to the first, the second and/or the combined electronic documents being visible to the user at the time they select.

The processor may have locally available memory and access to a communications link to a remote memory resource may be provided, and wherein pursuant to identification of the first electronic document the processor is adapted to establish whether or not the first electronic document exists in said locally available memory and if it does not the processor communicates via the communications link with said remote memory resource to cause said first electronic document, or a copy of the first electronic document, to be transferred to said locally available memory. Thus, a user can link to electronic documents that they do not actually have on their own computer memory, if they have the identity of the document they can retrieve the electronic document from external sources of data (e.g. a data warehouse, a library of files, etc.).

The communications link comprises at least one of:
(i) a LAN;
(ii) a WAN;
(iii) a MAN;
(iv) the internet The first physical identifier comprises a sheet of paper having a position determining pattern readable by said pen or other device to enable data relating to pen strokes, or device gestures, made upon said sheet to be captured, and an association between said second electronic document and said first electronic document may be established using data acquired by the pen, or device, to establish the identity of the sheet of paper, and said association is made either:
(i) after a user has finished writing upon or marking, or gesturing upon, the sheet of paper; or
(ii) when the pen or other device recognises the identity of the sheet of paper.

Thus, the user may write on the paper and then link the newly-created data to another electronic document (e.g. file), or the user may link a blank piece of pattern to an existing electronic document/file and then write/mark the paper, creating human-discernable content, with the link/association pre-made.

There may be a first electronic document file established in computer memory, and a second electronic document resides in a second computer memory file, and there may be an association made associating the first and second files by a computer processor, said association being made before, during, or after, a user writes or marks the sheet of paper with the pen or device to populate the first file with data.

According to another preferred embodiment of the invention there is provided a method of producing an electronic document having equivalent human readable content corresponding to the human readable content of a first digital paper document and having human readable content corresponding to the human readable content of a second digital paper document, the method comprising making a linking act with a document linking device, or making a linking gesture with a digital pen or other device, on the first and second digital paper documents, thereby identifying electronic equivalent documents of said first and second digital paper documents, and causing said electronic equivalent document to be linked, using a computer processor, to form an electronic document.

According to another preferred embodiment of the invention, there is provided a system for presenting to a user a visual representation of a combined document including at least some user readable content from a first paper document and at least some user readable content from a second paper document, the system comprising:
  a digital pen or digital document linking device, the pen or device having a position determining sensor or camera adapted to acquire information to enable the position of the pen or device to be determined;
  a first paper sheet having a first digital pen-readable, or device-readable, pattern to enable the digital pen or device to acquire information from the first paper sheet to enable the position of the pen or device in the first pattern to be determined;
  a second paper sheet comprising a paper document having a second digital pen-readable or device readable pattern to enable the digital pen or device to acquire information from the second paper sheet to enable the position of the pen or device in the second pattern to be determined, and there being an electronic equivalent document equivalent to the content of the second paper sheet;
  a computer processor adapted to process signals from the pen or device;
  a communications link adapted to communicate the pen or device with the processor to enable said signals to be communicated to the processor, said signals including pen or device acquired data capable of enabling the position of the pen or device in the patterns to be identified;

and wherein:
the processor has software which when run is adapted to:—
identify the second electronic document equivalent to the content of the second document using second pattern-related data acquired by the pen or device:—
to create a first electronic document representative of user-applied pen strokes, or device movements or actions, made on the first paper sheet when the user creates a first, written or user, pen or device, created, paper document on the first paper sheet;
to interpret data derived from pen strokes made by the user, or device actions or movements, performed by the user, on the first and second paper sheets as linking instructions to create a link between the second electronic document and the first electronic document so as to enable a visual representation to be produced of the second paper document with the pen or device created first paper document associated with it; and
to act on the linking instructions so as to cause the first and second electronic documents to be so linked.

The software may be adapted to interpret a linking mark made with the pen or device by the user that is made on a selected part of the second document and a selected part of the first sheet as instructions to create a visual representation derived from the first and second electronic documents with the selected parts aligned in the visual representation. The software may be adapted to cause a third electronic document to be produced and stored in processor-accessible memory, said third electronic document comprising data obtained from the first and second electronic documents. The software may be adapted to cause a set of instructions to be produced which, when a user requests the production of the visual representation of the combined electronic document, references data from the first and second electronic documents to create the visual representation of the combined document.

According to another preferred embodiment of the invention there is provided a method of creating a display of an electronic document comprising having paper documents formed on digital paper and having electronic equivalent documents equivalent to the paper documents, and making linking gestures or actions with a digital pen or other device on the paper documents to link the electronic documents and to control the layout of the display of the combined or linked electronic document so that the layout has content equivalent to the paper documents arranged in a position and relationship dictated by the movements of the digital pen or device when making said linking gestures or actions with the pen or device.

According to another preferred embodiment of the invention there is provided a method of creating an electronic display of a paper document annotated by notelets comprising printing the paper document on digital paper having a position-determining pattern, having notelets of digital paper having a position-determining pattern, annotating the notelets using a digital pen or other device, placing the notelets at desired positions on one or more pages of the paper document, and using the digital pen or other device to read the position determining pattern of each placed notelet and of the part of its page of the paper document adjacent the placed notelet, and using pen-acquired, or device-acquired, position data to create an electronic version of the written notelets and to align the positioning of the displayed electronic version of the notelets with the electronic version of the content of the document.

A notelet aligning mark or track may be made by the pen or device and may comprise a continuous line drawn or tracked with the pen or device extending across the boundary between a placed notelet and the underlying page of the paper document, the mark or track being made whilst applying writing pressure to a writing tip of the pen as it transits between the notelet and the paper, or whilst performing a writing, or track-defining, action with the device. The track may not mark the notelet or paper: the device or pen may simply read their patterns as it transits from one of notelet or paper to the other of them.

According to another preferred embodiment of the invention there is provided a method of associating a plurality of electronic documents having human readable content when the documents are displayed comprising printing pieces of digital paper having position determining pattern readable by a digital pattern reader, associating in computer memory the identity of the electronic documents with respective particular regions of position-determining pattern, and using a pattern reader to read the particular regions of the pattern, and linking the electronic documents pursuant to identifying them from the particular regions of pattern read by the pattern reader.

The pen, or device, may have a pressure sensor to determine whether a tip of the pen is being urged against said physical paper identifier, or a component of the device is being urged against the physical paper identifier, and making said linking mark or gesture may comprise arranging the first and second physical paper identifiers to be adjacent to each other and running the tip of the pen, or the component of the device, from a position on one of the physical paper identifiers that contains coding for the identity of one of the electronic documents to a position in the other of the physical paper identifiers that contains coding for the identity of the other of the electronic documents, the tip of the pen, or component of the device, moving between the said positions on the first and second physical paper identifiers whilst having continual uninterrupted pressure applied to the tip of the pen or component, as detected by the pressure sensor, the processor interpreting a transition from one physical paper identifier to another physical paper identifier, without interruption of a pressure signal from the pressure sensor, as instructions to link the electronic documents identified by the physical paper identifiers.

According to a preferred embodiment of the invention, a method of producing an electronic document having human readable content corresponding to said human readable content of a first digital paper document and having human readable content corresponding to said human readable content of a second digital paper document, said method comprising one of making a linking gesture with a digital pen and performing an act with another electronic document linking device on said first and second digital paper documents, thereby identifying electronic equivalent documents of said first and second digital paper documents, and causing said electronic equivalent documents to be linked, using a computer processor, to form said electronic document is provided.

In another preferred embodiment of the invention, a method of creating a display of an electronic document comprising having paper documents formed on digital paper and having electronic equivalent documents equivalent to said paper documents, and making linking actions with one of a digital pen and other device on said paper documents to link said electronic documents and to control said layout of said display of said linked electronic document so that said layout has content equivalent to said paper documents arranged in a position and relationship dictated by said actions of said one of said pen and other device when making said linking actions with said one of said digital pen and device is provided.

In another preferred embodiment of the invention, a method of creating an electronic display of a paper document annotated by notelets comprising printing said paper document on digital paper having a position-determining pattern, having notelets of digital paper having a position-determining pattern, annotating said notelets using a device, placing said notelets at desired positions on one or more pages of said paper document, and using said device to read said position determining pattern of each placed notelet and of the part of its page of said paper document adjacent said placed notelet, and using device-acquired position data to create an electronic version of said written notelets and to align said positioning of said displayed electronic version of said notelets with said electronic version of said content of said document is provided. Most preferably, the device is a digital pen and in which a notelet aligning mark comprising a continuous line is drawn with said pen extending across said boundary between a placed notelet and said underlying page of said paper document, said mark being made whilst applying writing pressure to a writing tip of said pen as it transits between said notelet and said paper, or whilst performing a writing action with said pen.

In another preferred embodiment of the invention, a method of associating a plurality of electronic documents having human readable content when said documents are displayed comprising printing pieces of digital paper having position determining pattern readable by a digital pattern reader, associating in computer memory the identity of said electronic documents with respective particular regions of position-determining pattern, and using a pattern reader to read said particular regions of said pattern, and linking said electronic documents pursuant to identifying them from said particular regions of pattern read by said pattern reader is provided.

Most preferably, the device is used to read a second physical paper identifier coding for said second electronic document and to communicate to said processor information enabling said identity of said second electronic document to be established, and wherein said device is a digital pen, and said pen has a pressure sensor to determine whether a tip of said pen is being urged against said physical paper identifier, and wherein making said one of linking action, mark and gesture comprises arranging said first and second physical paper identifiers to be adjacent to each other and running said tip of said pen from a position on one of said physical paper identifiers that contains coding for said identity of one of said electronic documents to a position in said other of said physical paper identifiers that contains coding for said identity of said other of said electronic documents, said tip of said pen moving between said positions on said first and second physical paper identifiers whilst having continual uninterrupted pressure applied to said tip of said pen, as detected by said pressure sensor, said processor interpreting a transition from one physical paper identifier to another physical paper identifier, without interruption of a pressure signal from said pressure sensor, as instructions to link said electronic documents identified by said physical paper identifiers.

In a preferred embodiment of the invention, use of one of a digital pen and other device to read code upon physical representations of electronic documents to cause said electronic documents to be associated in a modified or new electronic document, said code identifying said electronic documents is provided.

In a further preferred embodiment of the invention, a system is provided for presenting to a user a visual representation of a combined document including at least some user readable content from a first paper document and at least some user readable content from a second paper document, said system comprising:

a digital pen having a writing tip, a light source adapted to shine light onto paper, a camera adapted to receive light from said light source that has been reflected off said paper so as to acquire information to enable said position of said writing tip on said paper to be determined, and a pressure sensor, said digital pen being adapted to acquire said information when said pressure sensor senses writing pressure;

a first paper sheet having a first digital pen-readable pattern to enable said digital pen to determine its position in said first pattern;

a second paper sheet comprising a paper document having a second digital pen-readable pattern to enable said digital pen to determine its position in said second pattern, and there being an electronic equivalent document equivalent to said content of said second paper sheet;

a computer processor adapted to process signals from said pen;

a communications link adapted to communicate said pen with said processor to enable said signals to be communicated to said processor, said signals including pen acquired data capable of enabling said position of said pen in said patterns to be identified;

and wherein:

said processor has software which when run is adapted to:— identify said second electronic document equivalent to said content of said second document using second pattern-related data acquired by said pen:— to create a first electronic document representative of user-applied pen strokes made on said first paper sheet when said user creates a first, written, paper document on said first paper sheet;

to interpret data derived from pen strokes made by said user in which said pen first reads, one of said first digital pen-readable pattern and said second digital pen-readable pattern, and then reads said other one of said first digital pen-readable pattern and said second digital pen-readable pattern, whilst maintaining said writing pressure on said pressure sensor, as linking instructions to create a link between said second electronic document and said first electronic document so as to enable a visual representation to be produced of said second paper document with said pen-applied first paper document associated with it; and to act on said linking instructions so as to cause said first and second electronic documents to be so linked.

In a further preferred embodiment of the invention, a method of linking different electronic documents is provided comprising using a hand held electric document viewing device capable of acquiring document-identifying data from paper coding for said digital documents to mediate said linking association of said different electronic documents.

BRIEF DESCRIPTION OF THE DRAWINGS

Embodiments of the invention will now be described, by way of example only, with reference to the accompanying drawings, of which;

FIG. 17 shows schematically hardcopy documents having link marks in the form of a special character;

FIG. 20 shows schematically a first example of a hardcopy of an electronic document resulting from link marks on the first hardcopy document and the adhesive notelets illustrated in FIG. 19;

FIG. 21 shows schematically a second example of a hardcopy of an electronic document resulting from link marks on the first hardcopy document and the adhesive notelets shown in FIG. 19;

FIG. 22 shows schematically a third example of a hardcopy of an electronic document resulting from link marks on the first hardcopy document and the adhesive notelets shown in FIG. 19;

FIG. 23 shows schematically the first and second hardcopy documents and an adhesive notelet, the electronic copies of which are to be associated;

FIG. 31 shows schematically a hardcopy of which a page having an identifying pattern 302 has be made in the form of perforations, indentations or protrusions;

DETAILED DESCRIPTION OF SOME EMBODIMENTS OF THE INVENTION

Figure 1:
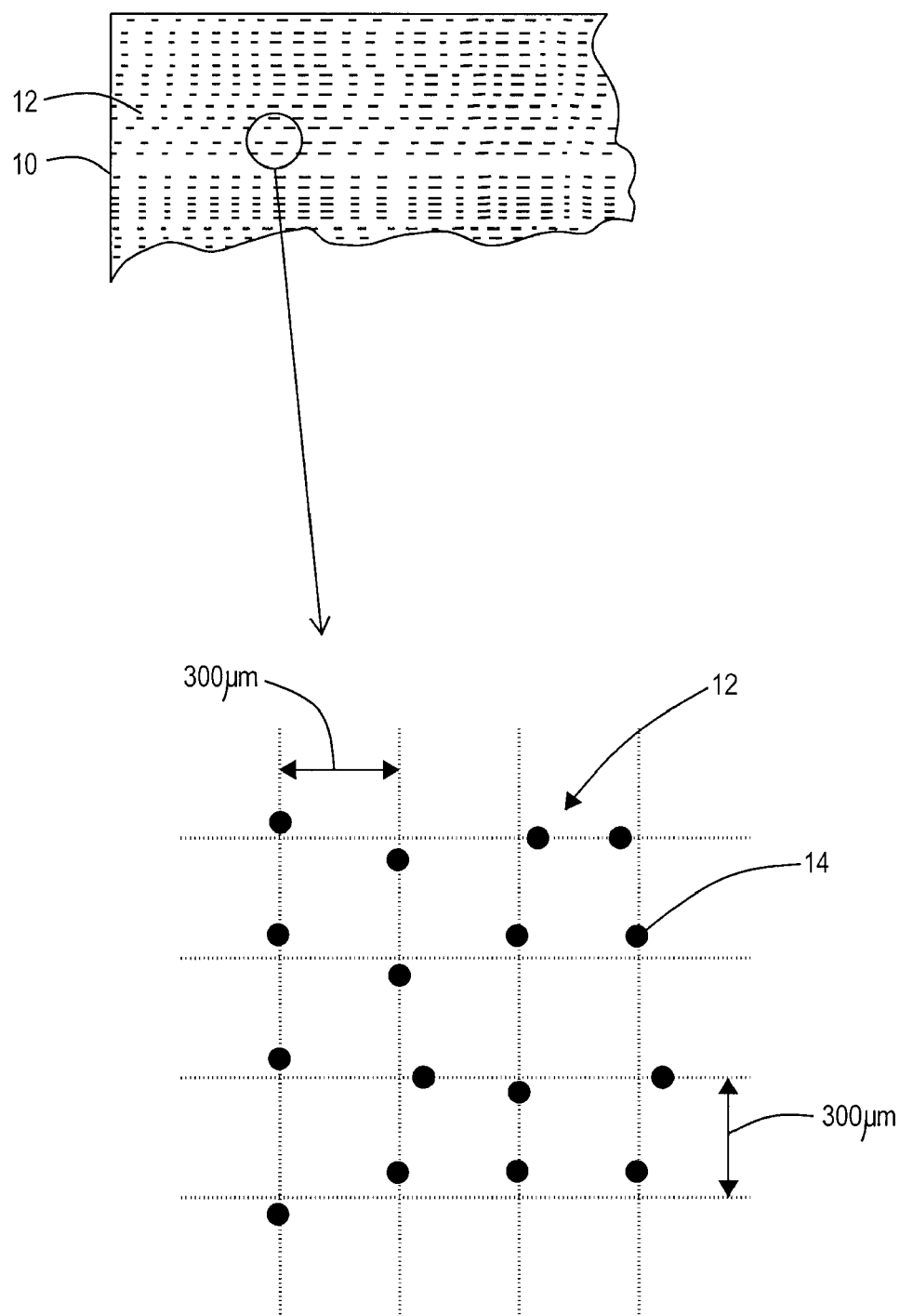
FIG. 1 shows schematically a sheet of prior art Anoto digital paper.
Figure 2:
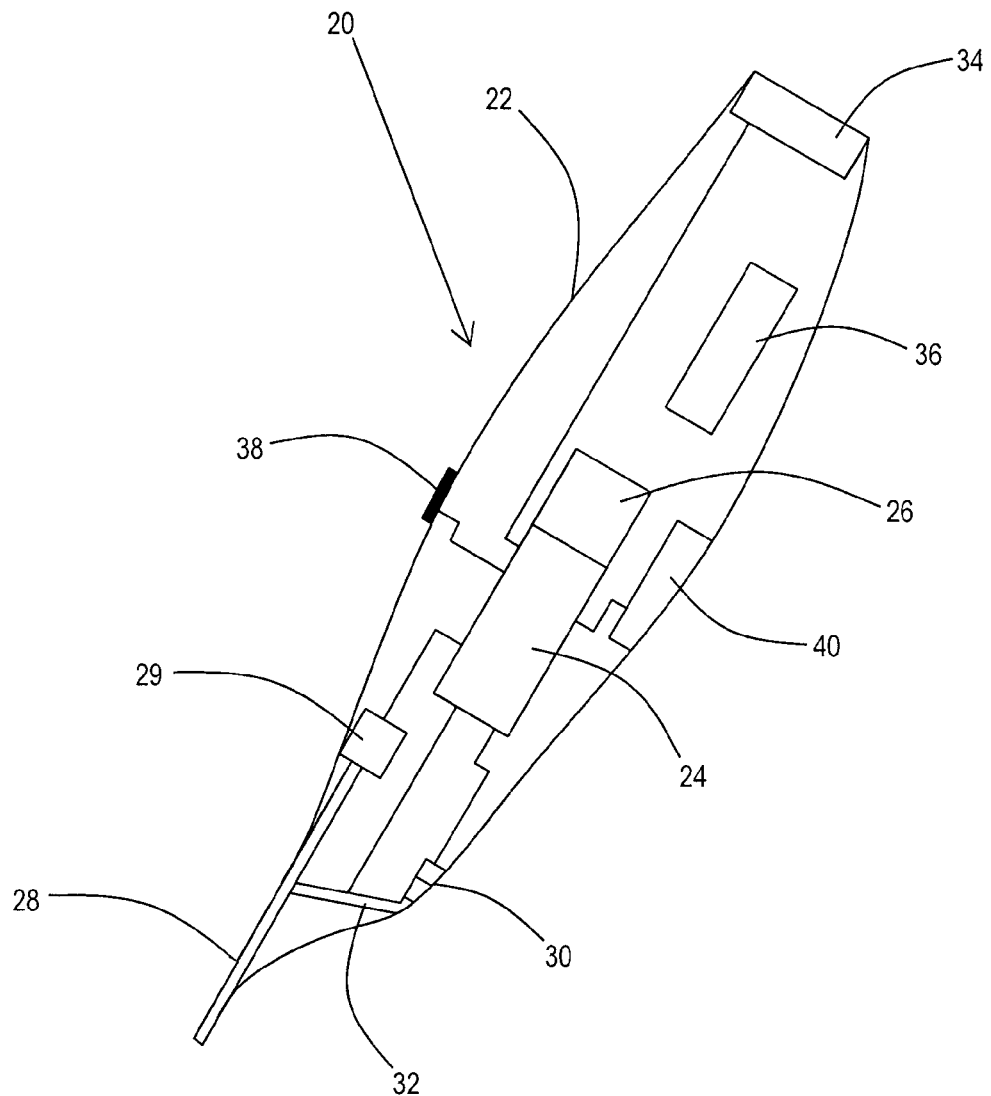
FIG. 2 shows schematically an existing digital pen.

FIGS. 1 and 2, relating to known Anoto digital pen and paper, have already been described.

Figure 3:
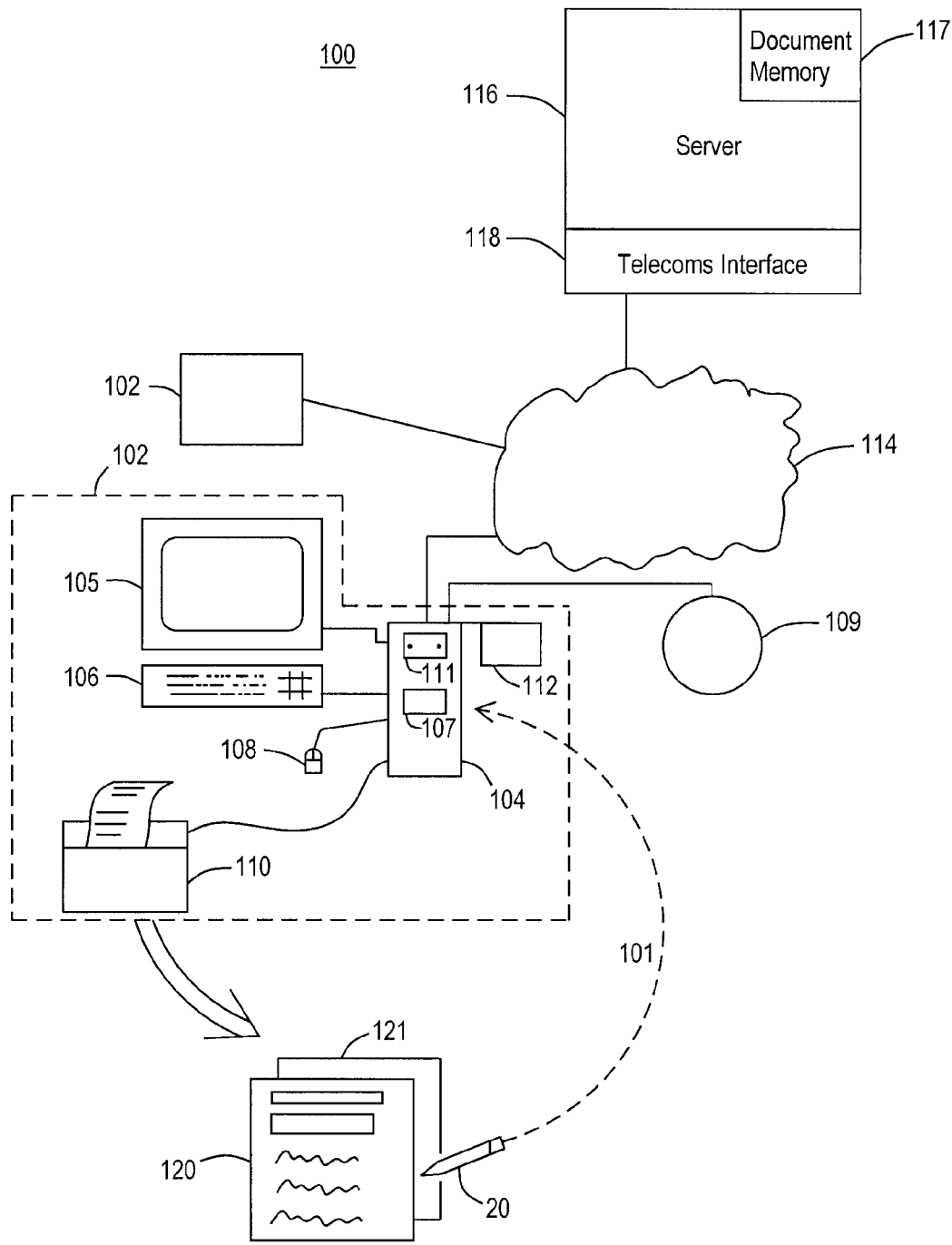
FIG. 3 shows schematically a system for associating electronic documents in accordance with at least one embodiment of the invention.

FIG. 3 is a schematic illustration of a system 100 for associating electronic documents following the manipulation of digital paper equivalents 120, 121 of those documents in accordance with at least one embodiment of the invention. The system 100 comprises a workstation 102 including a personal computer (PC) 104 which is connected to a printer 110. The PC 104 can be connected to the Internet 114 or a local network such as a LAN 109 having peripheral devices and/or other computers (e.g. PCs 104). The workstation 102 includes a user interface including a screen 105, a keyboard 106 and a mouse 108. The PC 104 has as a processor 107, a memory 112, and I/O devices (not shown) by means of which the processor communicates with the screen 105, the keyboard 104 and the mouse 106 and a communications port 111 by means of which it can communicate with the Internet 114 or the local network 109.

A server 116 is connected to the Internet 114 via a telecommunications interface 118. The server 116 could also be connected to the LAN 109, and the LAN 109 may be connected to the Internet. The server 116 has a document memory 117.

The system 100 illustrated in FIG. 3 includes a digital pen 20. The digital pen has already been described with reference to FIG. 2 and is able to send a digital version of markings made on digital paper to a receiver, for example a receiver associated with the PC 104.

The system 100 illustrated in FIG. 3 may be used to print out an electronic document, from the PC memory 111 or from the document memory 117 on the server 116, in a form that is suitable for annotation by the digital pen 20. The documents are printed to produce a hardcopies 120, 121 that has both the content of the electronic documents and a position pattern 12 (see FIGS. 1 and 2) to enable a digital pen 20 to identify its position on the page.

The user interface of the PC 104 allows a user to the view electronic versions of digital documents to be printed, using a software application, on the screen 105, and to make modifications to what is printed out prior to printing, or to associate certain regions of pattern with specific functionality prior to printing. The user interface includes the keyboard 106 and mouse 108 and software (not shown) for processing inputs from them, as well as the screen 105 and software for producing the content, e.g. images and/or text, on the screen.

The software that is used to process the markings made by the digital pen 20 will, for convenience, be termed 'pen-input' software. The pen-input software may be run on the PC processor 107 or some of the pen-input software may be run on the pen processor 24 and some of the software may be run on the PC processor 107.

Figure 3A:
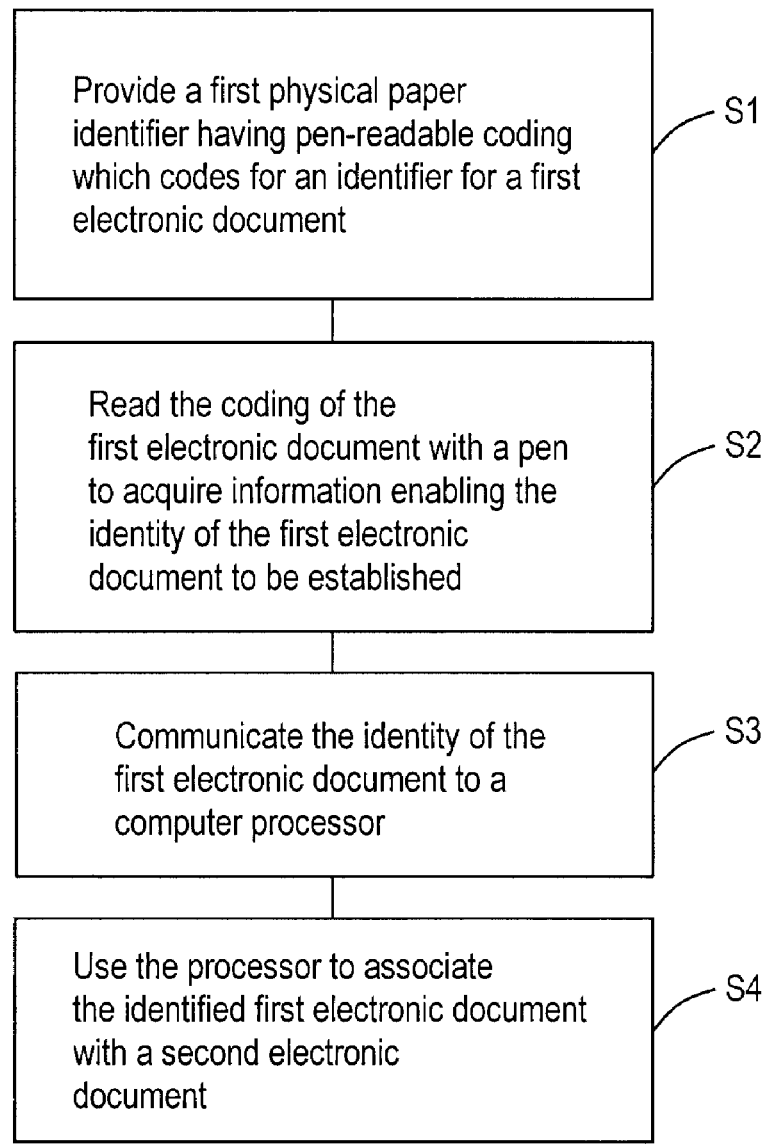
FIG. 3a shows schematically a method for associating a first electronic document with a second electronic document that may be performed using the system illustrated in FIG. 3.

FIG. 3a illustrates a method for associating a first electronic document with a second electronic document that may be performed using the system 100 illustrated in FIG. 3. In step S1 a first physical paper identifier having pen-readable coding which codes for an identifier for the first electronic document is produced. The first physical paper identifier may be a hardcopy, or a portion thereof, of the first electronic document. The pen-readable coding may, for example, be a region of dot pattern 12 that is printed on the first physical paper identifier. In step S2 the coding of the first electronic document is read with the digital pen 20 to acquire information enabling the identity of the first electronic document to be established. In step S3 that identity is communicated to the computer processor 107. In step S4 the processor 107 associates the identified first electronic document with the second electronic document.

Figure 4:
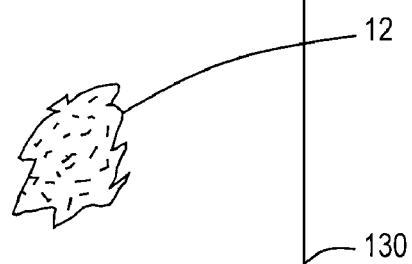
FIG. 4 shows schematically a hardcopy of a first document.

FIG. 4 is a schematic illustration of a document 130 that has been printed out on paper having a dot pattern 12. In the example illustrated the printed document 130 is an agenda for a meeting (entitled "agenda"). The agenda is to be distributed to a number of recipients before the meeting. A user may wish to attach a different document, such as the minutes from a previous meeting (entitled "minutes"), to the agenda document. The user may search for the electronic version of the minutes using his PC 104 in the conventional way and attach both the agenda and the minutes to an email to be sent to the recipients. However, if the user has hardcopies of the agenda 130 and minutes 132 printed out on paper that has a dot pattern 12 then the user may associate the electronic copies of the agenda and the minutes by using the digital pen 20 in conjunction with the hardcopy documents 130, 132, in a manner to be described.

It is not necessary for the hardcopies of the Agenda and Minutes to be printed documents. The printer 110 could be used to produce a "blank" sheet of digital paper, i.e. paper which has only the dot pattern 12, the user could then hand-write the agenda on to the blank sheet with the digital pen 20. The PC 104 would then associate the handwriting with the portion of pattern space assigned to the blank sheet to produce an electronic version of the document. It should be noted that the invention is not limited to the use of paper and the hardcopies may be formed from other material, by way of example the hardcopy may be made photographic film, a photograph, a photograph negative or a material suitable for use with overhead projectors or slide projectors.

Figure 5:
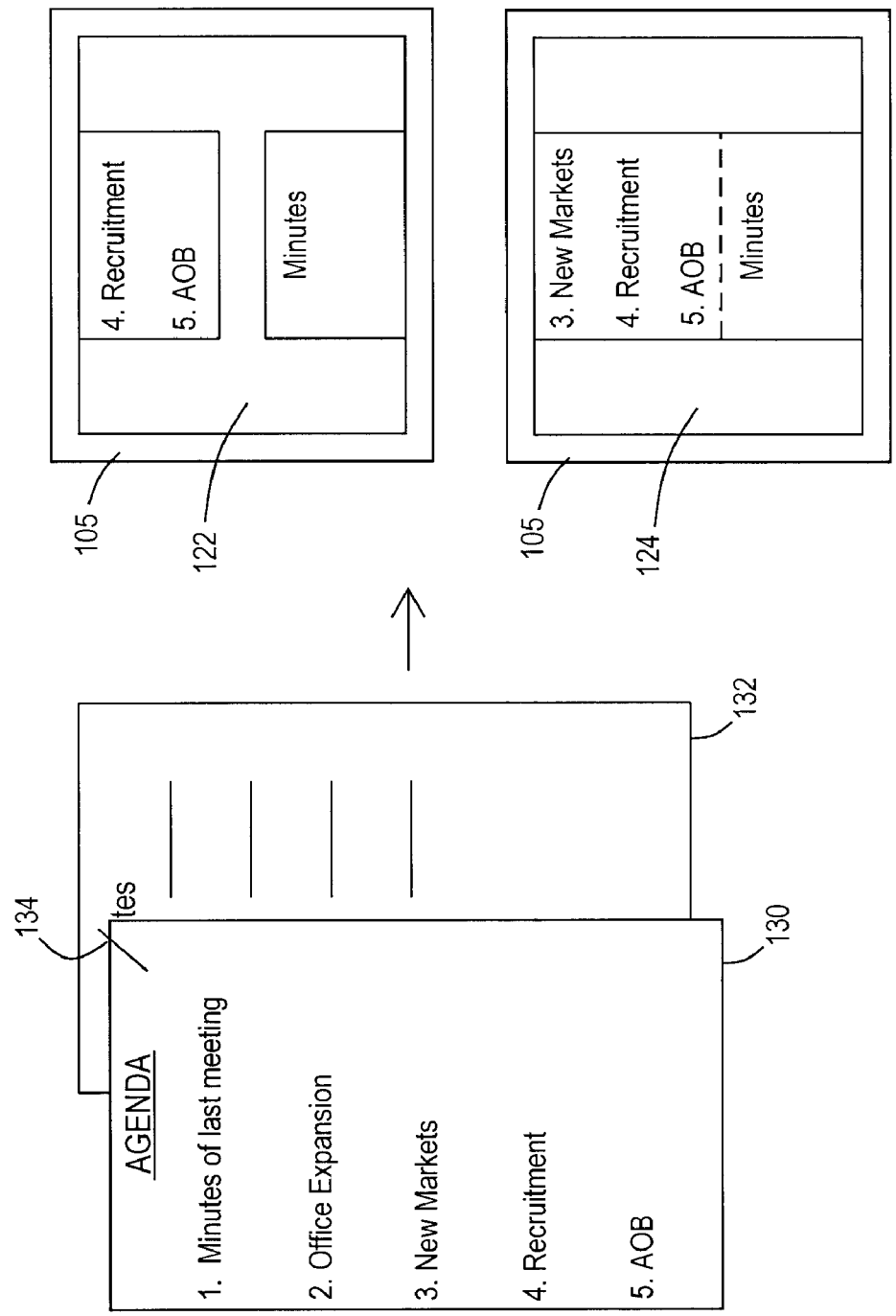
FIG. 5 shows schematically the hardcopy of the first document, a hardcopy of a second document to be associated with the first document, and representations of a combined electronic document on a computer screen.

FIG. 5 illustrates a hardcopy of the agenda 130 and a hardcopy of the minutes 132 which has been placed behind the hardcopy of the agenda 130 so that the hardcopies 130, 132 overlap. The digital pen 20 is then used to make a trace, referenced 134, from the agenda 130 to the minutes 132. The user simply draws a continuous line extending from one sheet of paper onto the other sheet of paper, without lifting the pen from the paper (so that the pressure sensor of the pen sees a writing pressure at all times).

During the writing of the trace 134 the pen 20 is continually pressed against the hardcopies 130, 132 and the pressure sensor 29 is activated. The pen 20, therefore reads the dot pattern 12 on the copies 130, 132 throughout the trace and sends this information back to the PC 104. In this way, the pen 20 reads a portion of the dot pattern 12 that corresponds to the agenda and then, in the same trace the pen 20 reads a portion of dot pattern that corresponds to the minutes, with the pressure sensor 29 noticing a continued "writing" pressure, without a "no pressure" gap as would occur if a user simply wrote on the two pages at different times. In a variant embodiment if pressure is not removed the pressure sensor can actually also pass over a blank areas without pattern (e.g. the margins of a page depending on how the page/sheet is printed) and then enter into the second pattern area and detect the page/sheet identity, and cause the association still. This avoids the need to have dot pattern all the way to the edge of the page—indeed a largely unpatterned page with an identity box of pattern could be used as either of, or both, pages that are used to link associated electronic documents. The paper pages need not actually replicate all of, or any of, the human readable content that is in the electronic documents associated with them (but in many embodiments they will have all of, or substantially all of, or at least a substantial or significant part of, the human-readable content of the equivalent electronic document shown on them). Having "blank" unpatterned, areas over which the pen travels when being used to link the electronic content of two pages may introduce some doubt about the exact relative position, and orientations of the paper, etc. but the association in the electronic/digital world can still be done.

The pen-input software on the PC 104 matches the portion of the dot pattern 12 read by the pen to the electronic document to which that portion of dot pattern space has been assigned. That is, when the digital pen 20 traces over, for example, the hardcopy of the agenda document 130 the PC 104 recognises that the pen 20 has made a trace on the document entitled "agenda" the electronic version of which is stored in the PC memory 111 or in the document memory 117. The software recognises that the pen has read first a dot pattern corresponding to one electronic document (the agenda) and then the dot pattern 12 corresponding to a second, different, electronic document (the minutes). The software uses the fact that different patterns associated with different electronic documents were seen by the pen, without release of pressure on the writing tip, as instructions to associate the two electronic documents. The associated documents may then be distributed, for example by email.

The associated electronic documents may appear as a single combined document, the 'electronic page' of minutes being behind the electronic page of the agenda. The combined document may replace the original electronic version of the agenda in the PC memory 111 or the document memory 117 in an operation analogous to the "Save" function found in many software applications, or the combined document may be saved as a document separate to either the original electronic versions of the agenda and minutes documents in an operation analogous to the "Save as" function found in many software applications. Additionally, or alternatively, links to one electronic/digital document can be added to the other electronic/digital document, or links ("shortcuts" in Windows) to each document can be gathered into one folder, or introduced into a composite electronic/digital document with only references/address pointers to other electronic documents (instead of containing their actual data).

The pages of the combined electronic document may be placed in the reverse order by tracing from the hardcopy of the minutes 132 to the hardcopy of the agenda 130 instead of from the hardcopy of the agenda 130 to the hardcopy of the minutes 132. In many embodiments, due to the pen trace and absolute positioning pattern the relative physical positions of the pages (relative position, relative orientation, and the stack order of pages) can be inferred from the pen stroke or strokes. Thus a reasonably accurate visual representation of the paper documents can be recreated in the digital/electronic world.

FIG. 5 illustrates the PC screen 105 with a first display 122 of a combined electronic document; this first display 122 is similar to the 'Print Layout' view available in Microsoft™ Word. FIG. 5 also illustrates the PC screen 105 with a second display 124 of the combined electronic document; this second display 124 is similar to the 'Normal' view available in Microsoft™ Word. It will be appreciated that although proprietary software is mentioned in this specification this is for illustrative purposes only and the invention is not limited to the use of any particular proprietary software.

Figure 6:
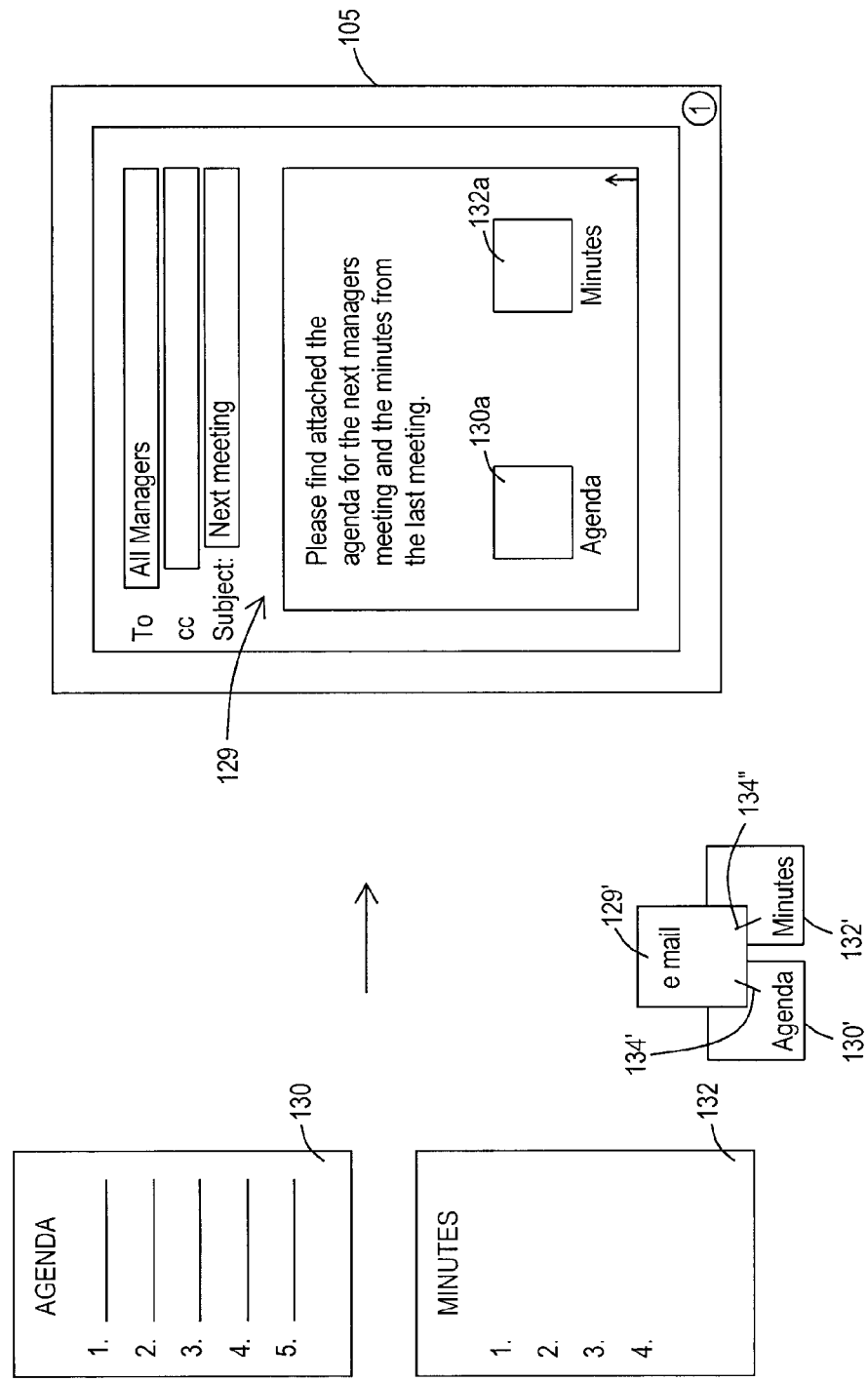
FIG. 6 shows schematically the hardcopies of the first and second documents of FIG. 5, and a representation of an email on a computer screen, the email having electronic versions of the first and second documents as attachments.

There are many other ways that the electronic versions of the hardcopy documents may be associated. FIG. 6 illustrates a representation of a single email 129 on the screen 105 in which the two electronic documents have been associated by placing them as attachments 130*a*, 132*a* to the single email 129. This allows the electronic documents to be distributed together but also allows the separate documents to be readily identified or to be amended or processed (e.g. edited, stored, forwarded or printed) individually by the recipient of the email. This might be achieved, as illustrated in FIG. 6*a*, by the user laying out an email sheet of patterned paper 129' over an agenda sheet of patterned paper 130' and a minutes sheet of patterned paper 132', and making two strokes 134' and 134", one to associate each electronic document with the email.

Figure 7:
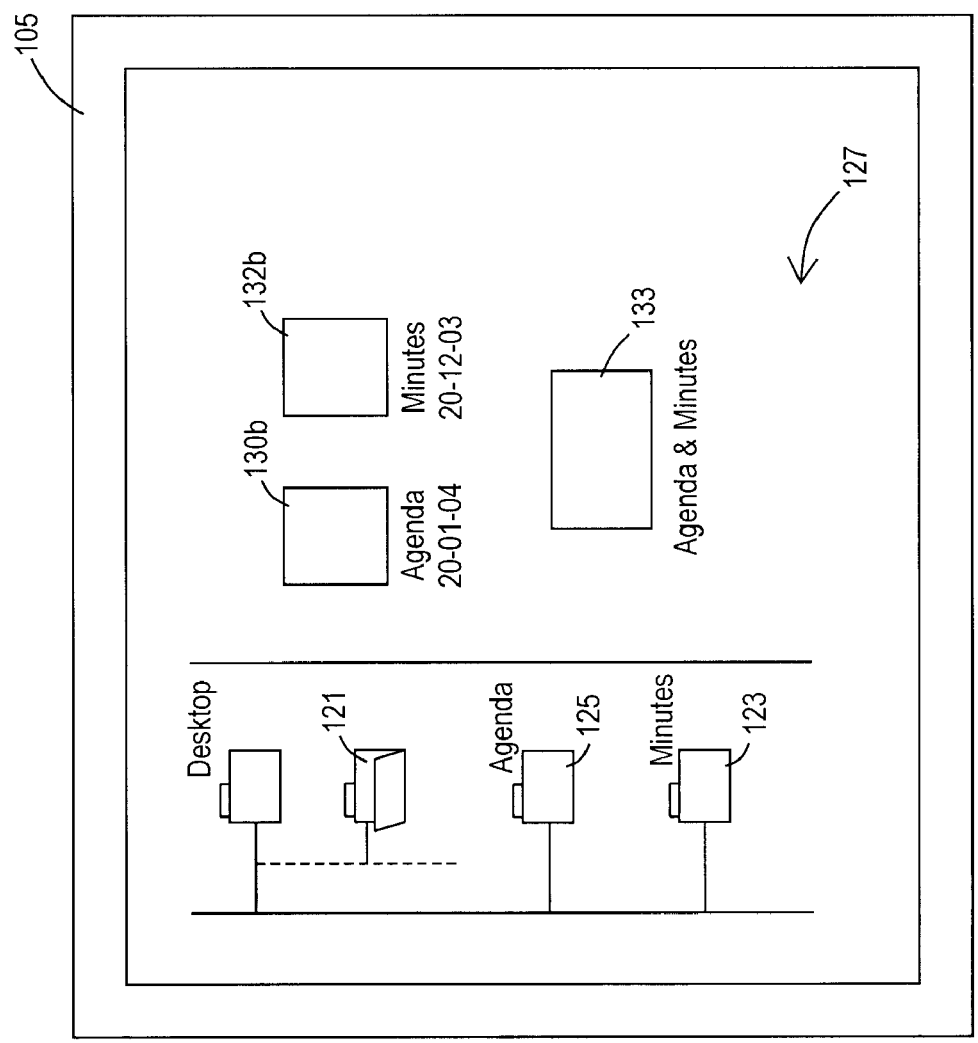
FIG. 7 shows schematically a representation of a file structure on a computer screen in which electronic versions of the first and second documents of FIG. 5 are stored.

FIG. 7 illustrates a representation of a file structure 127 on the screen 105. The file structure may have, for example, a folder 125 containing agenda documents and a separate folder 123 containing minutes documents. The digital pen 20 can be used to associate a particular agenda document, for example the agenda entitled "Agenda 20-1-04" contained in the agenda folder 125, with a particular minutes document, for example the agenda entitled "Minutes 20-12-03" contained in the minutes folder 123. These two associated electronic documents may then be placed in a new or existing electronic folder 126 as two separate electronic documents e.g. by copying them to this folder 126 or as a single electronic document 133 which is a combination of the electronic versions of the agenda and minutes documents. For a networked system 100, such as that illustrated in FIG. 3, the new or existing folder 121 can be configured so that it is accessible to people, or a subset of people, on the distribution list for the agenda.

The user may wish to have the nib 28 of the digital pen 20 extended so that an ink mark is made on the hardcopy, such that the ink mark follows the trace of the pen 20. The software may be configured such that when a link trace is made by the digital pen 20 which produces an ink mark on a hardcopy of a document there is no reproduction of the ink mark on the electronic copy of that document. If the user wants to keep the hardcopy clean of ink marks the user may be able to retract the nib 28 into the pen housing 22 during the pen stroke or cut of the supply of ink to the nib. For convenience the term "mark" is used to indicate a pen trace irrespective of whether the trace produces an ink mark.

If a user makes a link mark 134 that associates two documents and then changes his mind about making the association then the user may make a further "cancellation" mark that cross out the link mark to reverse the association process. In this case it would be convenient for an ink mark to also be produced when the pen is used to make the link mark to enable the user to make the cancellation mark in the right place and to keep track of whether or not an association has been cancelled.

Figure 8:
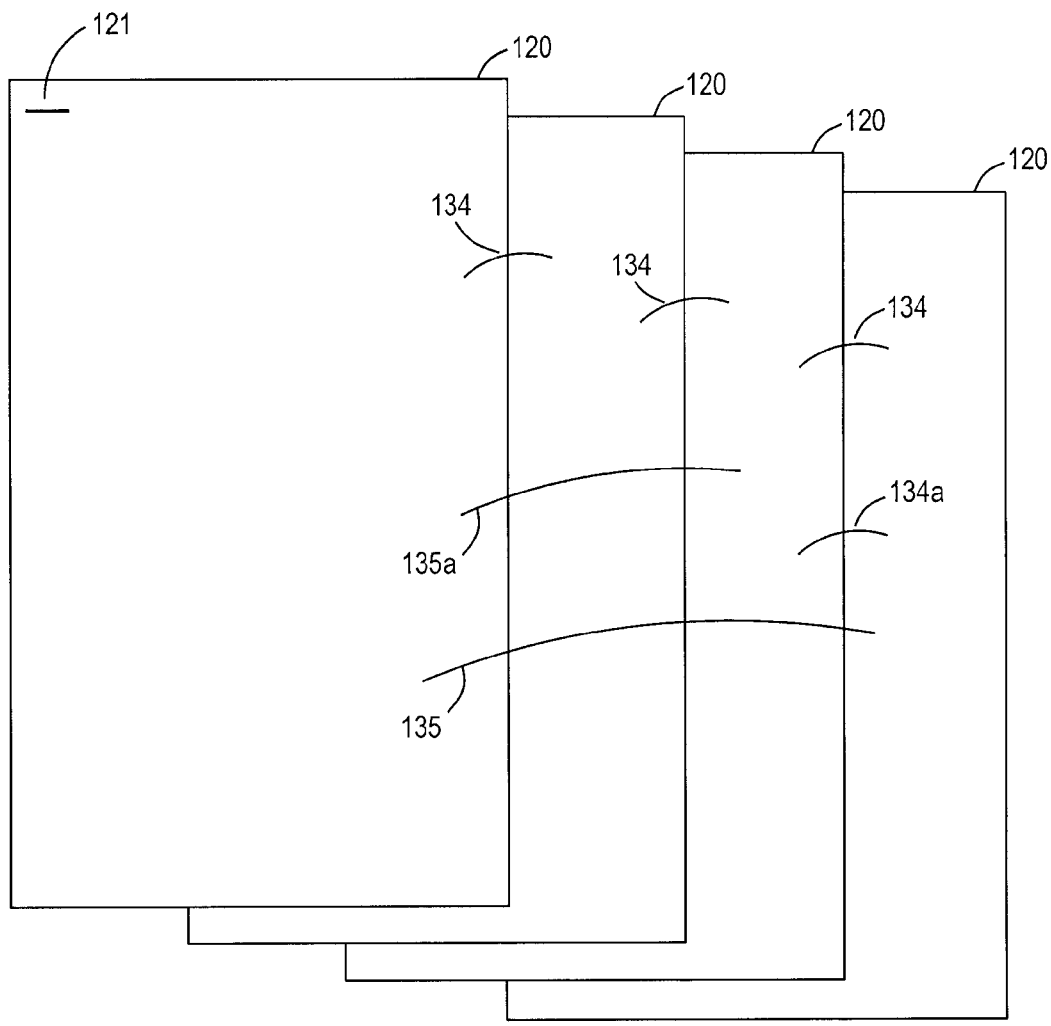
FIG. 8 shows schematically several hardcopy documents the electronic versions of which are to be associated.

FIG. 8 shows several hardcopy documents 120 that have been placed on top of one another and fanned out. Each hardcopy 120 may consist of more than one sheet and only the top sheet of each hardcopy is illustrated. The sheets in a multiple sheet hardcopy may be held together with, for example, a conventional staple 121. The electronic documents that correspond to the hard copies 120 can be associated by making several link marks 134, each individual link mark 134 covering two sheets of paper. Alternatively, a single link mark 135 can be used to cover all of the hardcopies 120 or a combination of link marks can be used—some covering two sheets (illustrated as link mark 134*a*) and some covering more than two sheets (illustrated as link mark 135*a*).

It will be noted that in the example illustrated in FIG. 8 it is not important where the link mark 134 is made on the sheets only that the link mark passes through an area of dot pattern 12 on a sheet so as to enable the electronic version of the document corresponding to the sheet to be identified from the pattern 12.

Figure 9:
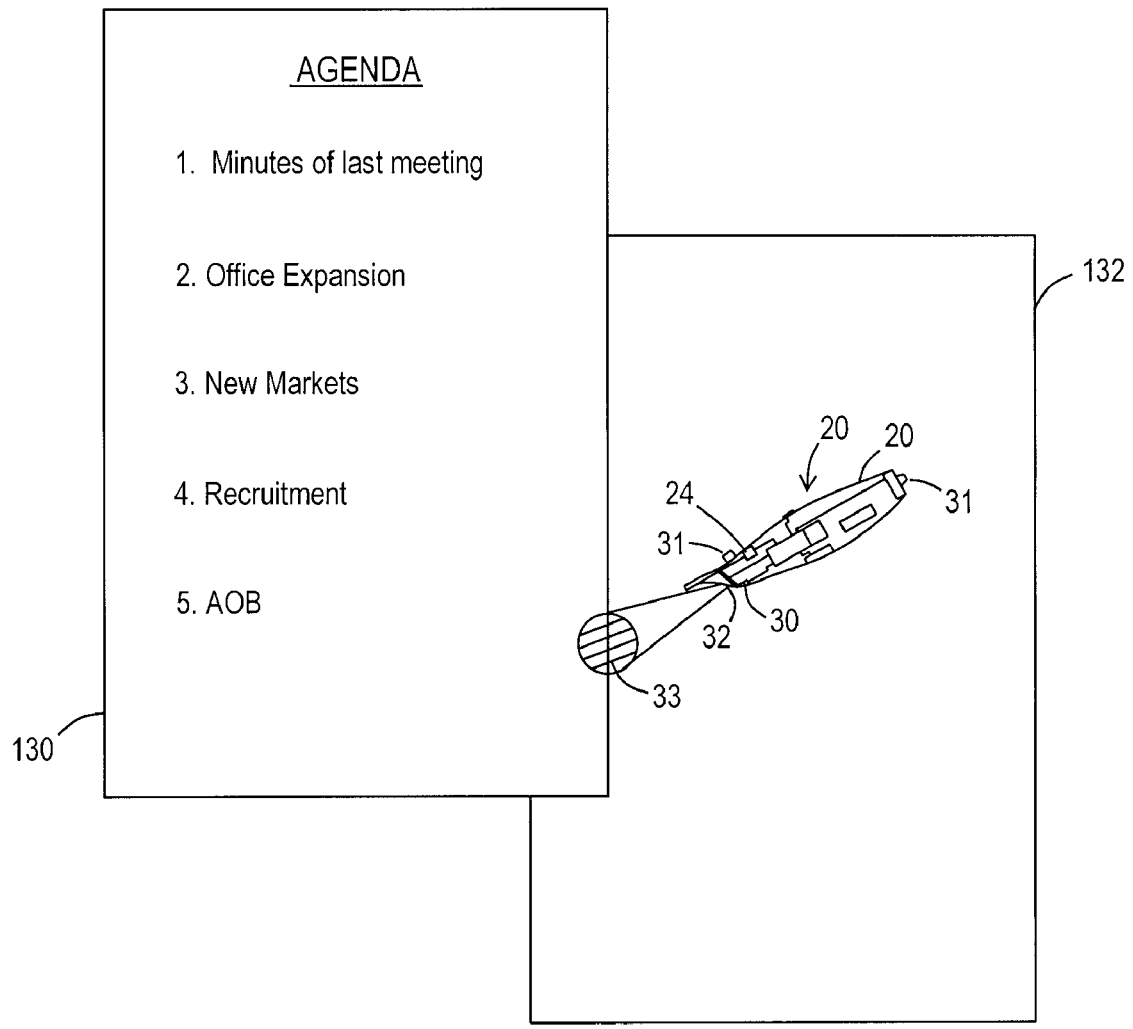
FIG. 9 shows schematically first and second hardcopy documents and a digital pen reading the dot pattern on the documents.

It is not necessary for the digital pen 20 to be in contact with the hardcopy for the pen 20 to read the dot pattern 12. FIG. 9 shows an adaptation of the digital pen 20 in which the pen 20 has a button 31 which can be depressed to activate the LED 30 and camera 32 housed inside the pen 20. In this way the pen 20 can read the dot pattern 12 when the pen 20 is close to, but not in contact with, the hardcopy. The button 31 may be positioned so that it protrudes from the pen housing 20. Conveniently, for one handed operation of the pen 20, the button 31 may be positioned at the end of the pen that is opposite to the nib of the pen so that the button may be readily activated by the user's thumb, alternatively the button 31 may be positioned near to the nib of the pen 20 so that the button can be activated when the pen 20 is gripped in the usual way as for writing. To ensure that the pen 20 is close enough to the hardcopy the visible warning light 38 or the vibration unit 40 (see FIG. 2) can be used to indicate whether the pen 20 is close enough to the hardcopy for the pen 20 to be able to read the dot pattern 12.

Alternatively, the pen 20 may have a switch (not shown) to activate the LED 30 and camera 32 and the button 31 is depressed to capture the output from the camera 32.

It is not necessary to use the pen 20 to mark the digital paper 10, or even to be in contact with the digital paper 10, all that is required is that the pen 20 reads the dot pattern 12 and that the software interprets the transition from one pattern to another as instructions to link electronic versions of the documents. Therefore, it will be understood that although embodiments of the invention are described with reference to a digital pen 20 the invention is realisable with hardware that is not in the form a pen.

To associate the electronic versions of two documents 130, 132 using this adaptation of the digital pen 20, the pen 20 may be first held over a sheet of one of the hardcopy documents 130 and the button 31 activated, and then held over a sheet of the other hardcopy document 132 and the button 31 activated. This may be akin to digitally "stapling" the documents together. Alternatively, as is shown in FIG. 9, the two hardcopies 130, 132 are overlapped (or positioned sufficiently closely) so that the IR beam 33 exiting from the digital pen 20 simultaneously cover a region of dot pattern on both documents.

As a visual aid to the user the LED 30 which emits the infra-red light may be chosen so that it simultaneously emits visible light, e.g. red light, so that it is easy for the user to ensure that the beam of the red light, and hence the beam of the IR light, covers both sheets. The beam of red light could also be used to gauge when the light is at an optimum distance from the paper, for example the optimum distance may be when the beam illuminates a portion of the paper that is, say, about 5-10 mm across. LEDs that have an emission spectrum that covers both the red and infra-red regions are well known. Alternatively the pen could have a separate light source to emit visible light, however in this case it may be difficult to ensure that the beam of visible light will be coincident with the beam of infra-red light on the hardcopy.

It is not necessary for the hardcopies that are to be associated to consist of a single sheet of paper. For example, the digital pen 20 can be used to trace from a sheet, e.g. the last page, of a multi-page first document to a sheet, e.g. the first page, of a second multi-page document.

Figure 10:
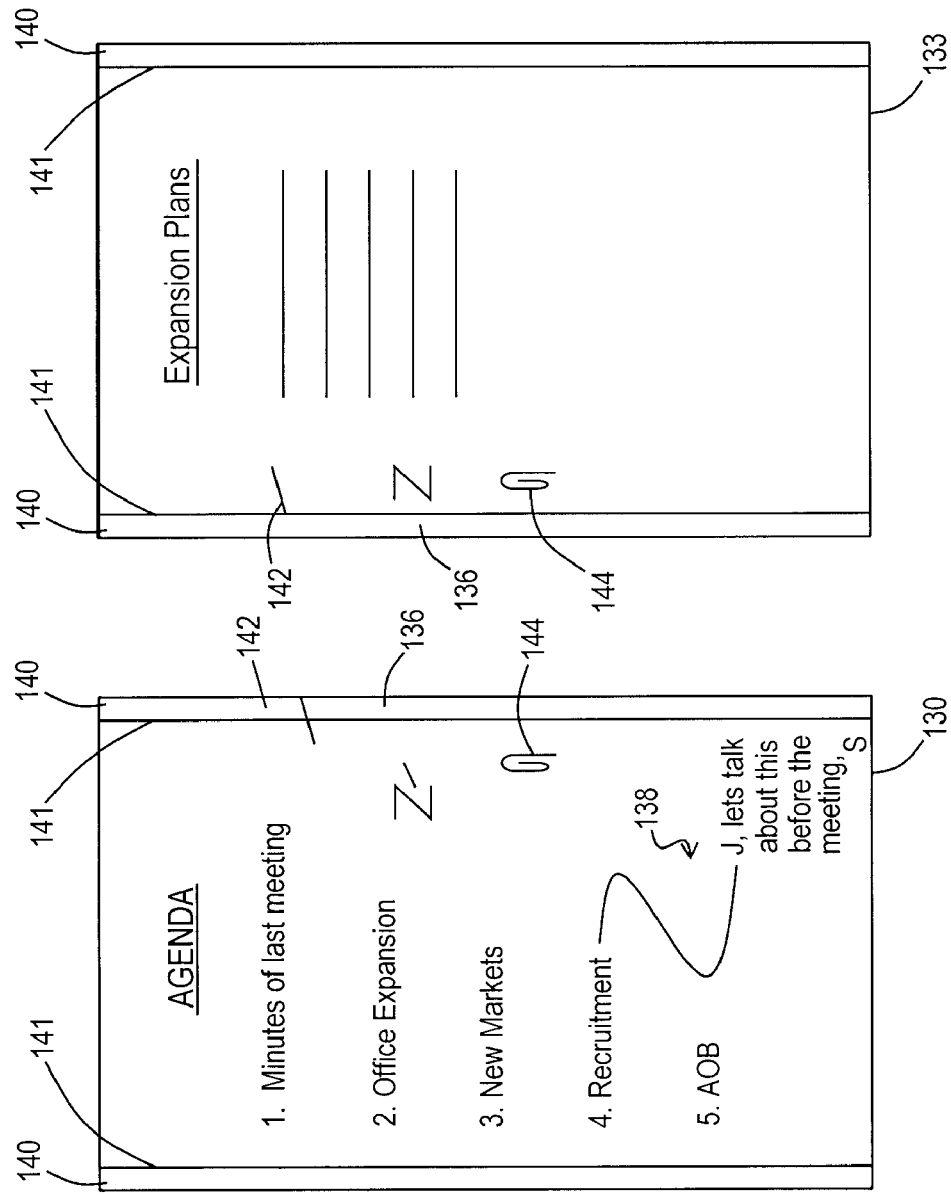
FIG. 10 shows schematically a first hardcopy document and another hardcopy document, the documents having link marks to associate the electronic versions of the documents.

It is not necessary in all embodiments for the hardcopies to be overlapped in order that the digital pen 20 can be used to link the electronic versions of the hardcopies. FIG. 10 illustrates two hardcopy documents, in this example an agenda for a meeting 130 and a document detailing an expansion plan 133 to be discussed at the meeting. The two hardcopies 130, 133 are physically separated and the digital pen 20 may be used to make a separate link mark on each hardcopy. A number of different types of link mark can be used as will now be discussed.

A first type of link mark 136 can be made anywhere on the hardcopies 130, 133 that has the dot pattern 12. The first type of link mark 136 can be of any form, it is only necessary that the digital pen 20 reads part of the dot pattern 12 on the hardcopy during the trace that produces the link mark 136. Since the digital pen 20 may also be used to make annotations 138 on the hardcopies 130, 133, it is necessary to be able to distinguish between pen marks that are annotations 138 and pen marks that are link marks 136. If the digital pen 20 is used to make a mark on one hardcopy 130 and then the next mark that is made by the pen 20 is on the other hardcopy 133 the pen-input software recognises this and determines that the marks are in fact link marks and associates the electronic versions of the documents. It may be that a user may wish to first annotate one hardcopy 130 then annotate another hardcopy. In this case, to prevent the annotations being determined as link marks then a limit may be set for the time between making a link mark on one hardcopy 130 and making a link mark on the other hardcopy 133. For example, if a mark is made on one hardcopy 130 and then within, say, one second, or three seconds or five seconds, a second mark is made on the other hardcopy 133 then the marks are interpreted as link marks 136, if the delay between the marks is greater than a predetermined time then the marks are interpreted as annotations.

An alternative way of distinguishing the first type of link mark 136 from annotations 138 is to depress a button (not shown) on the digital pen 20 during the pen stroke producing the link mark 136, or to press the button before the link mark 138 is made and press the button again after the link mark 138 has been made. In this way the depression of the button causes the pen processor 26 to put marker data in the transmission stream of dot pattern data sent to the PC 104 to mark the appropriate portion of the transmission stream as that relating to a link mark.

A second type of link mark 142 is to make a mark in a specific region of a hardcopy. The dot pattern 12 in this region is assigned to have a dedicated function so that the software will recognise that any mark made in this region is a link mark. The regions may conveniently be at the edge of a hardcopy, for example as margin regions 140. The margin regions 140 may be on only along one edge of the hardcopy sheets or any number of edges of the sheets. A visible line 141, for example a faintly visible line such as that commonly used to show a margin, may demarcate the specific regions assigned for link marks.

It will be appreciated that the concept of the special "link" box could be extended to be various boxes denominating the action to take, e.g. Move, Copy, Attach, Link, etc: a command box. There may be more than one command box on a page, and there may be a command panel having a plurality of command boxes.

Also there could be two or more different boxes to make a link instruction more explicit or detailed, for example "Attach to [ ]" and "Attach from [ ]" boxes. Similarly, there could be a "to" or "from" option associated with a "Copy" box, and/or a "Paste" box. These can, in some examples, be reused between actions based on the order of strokes and hence form "command" boxes to be combined with other strokes. Thus command instructions could be built up from a user selecting a plurality of command instructions to form a composite command.

Figure 11:
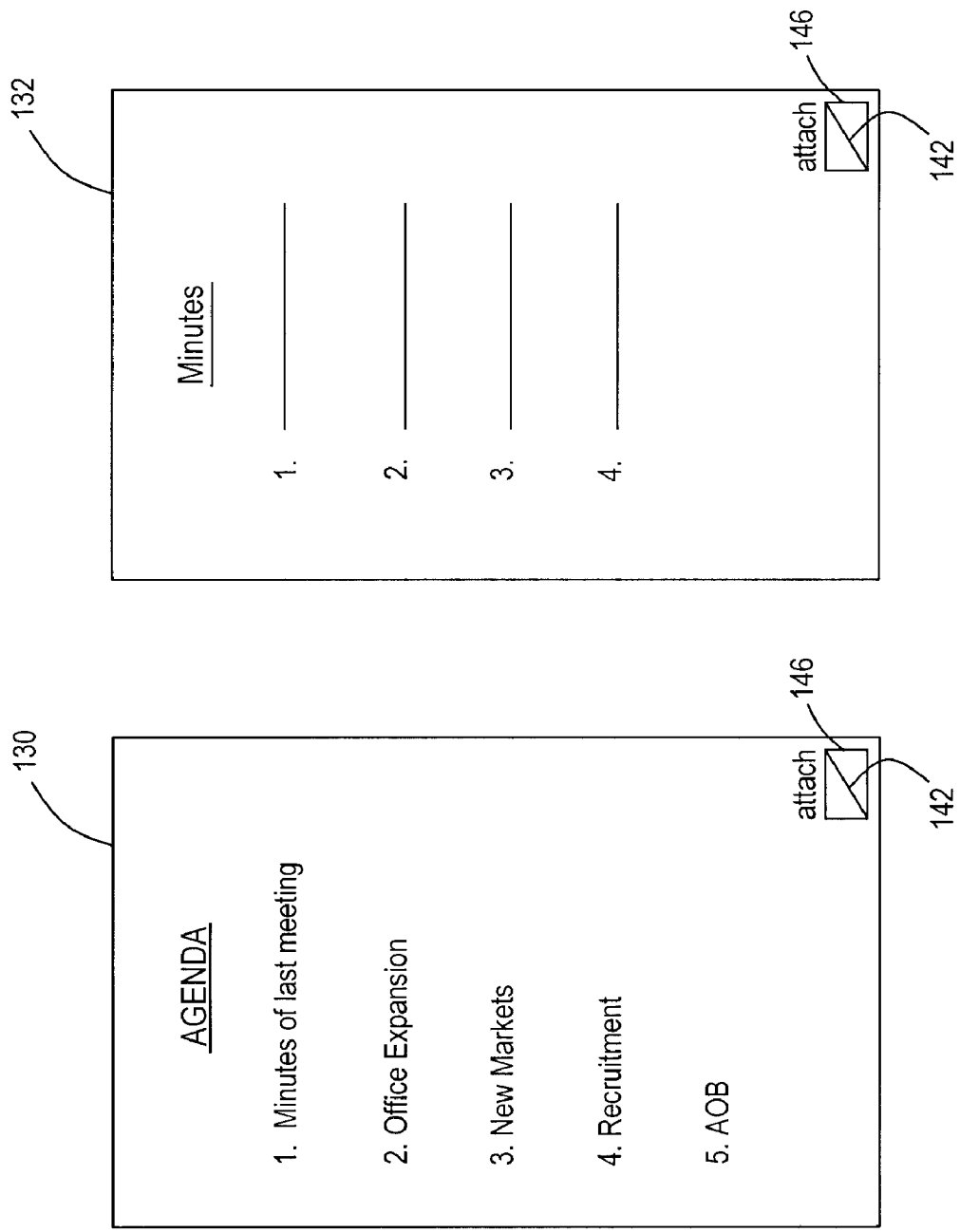
FIG. 11 shows schematically first and second hardcopy documents, the documents each having an attachment box.

FIG. 11 illustrates versions of the hardcopies 130, 132 in which the second type of link mark 142 is made in a visible "attachment" box 146. The box 146 need not be rectangular, as is illustrated, but may be any shape. The attachment boxes 146 on the hardcopies can be reused since the pen-input software will be able to distinguish the order in which the attachment boxes 146 have been marked with the digital pen 10 (the datastream produced by the pen including time data). For example, the box 146 on the agenda document 130 may be marked to indicate that an attachment is going to be made then the box 146 on the minutes document 132 is marked to attach this document to the agenda document 130, then if a hardcopy of a further document (not shown) is to be attached then the box 146 on either the agenda document 130 or on the minutes document 132 is marked again before the box 146 on the further hardcopy document is marked. If the box 146 of the minutes hardcopy 132 is marked before the further hardcopy is marked then the electronic version of the further document will be attached to the back of the electronic copy of the minutes document. If the box 146 of the agenda hardcopy 130 is marked before the further hardcopy is marked then the electronic version of the further hard copy document will be inserted between the electronic version of the agenda document and the electronic version of the minutes document.

Referring again to FIG. 10, a third type of link mark 144 can be made anywhere on a hardcopy that has a dot pattern 12, but in this case the link mark 144 takes a specific form or gesture made with the pen over the pattern. The pen-input software recognise the specific form as being a link mark. The pen-input software may include general character recognition software or software that only recognises link marks. If the general recognition software is operated then the specific form that is assigned to a link mark will need to be a form that does not correspond to an alphanumeric character, a punctuation mark or a commonly used symbol so that the link mark 144 is not confused with an annotation 138. The third type the link mark 144 that is illustrated in FIG. 10 takes a form that has the appearance of a paperclip but a multitude of other forms may be employed.

Figure 12:
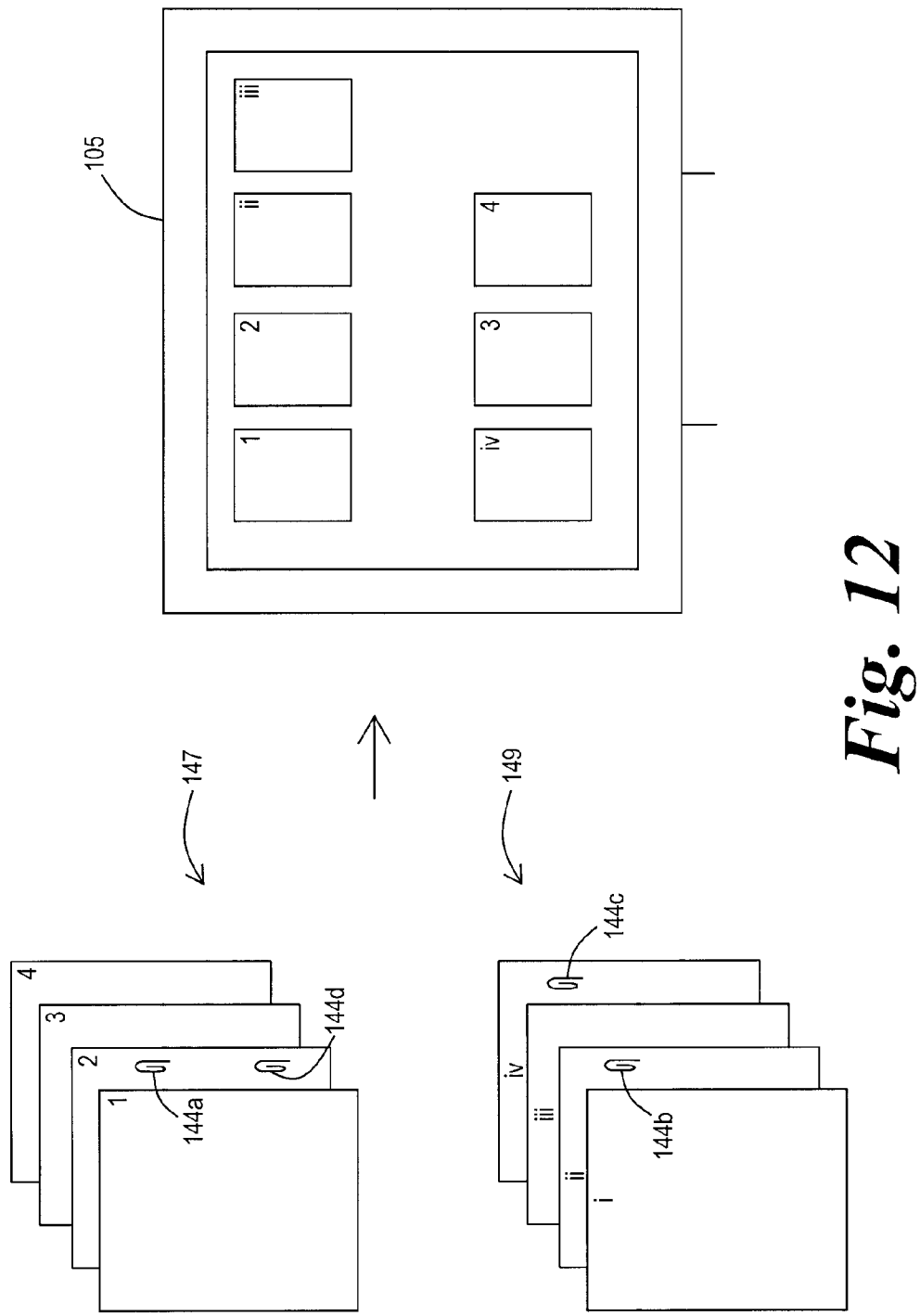
FIG. 12 shows schematically two hardcopy documents and a representation on a screen of an electronic version of a document containing pages that are selected from electronic versions of pages of the hardcopy documents.

It is also possible to insert one or more pages of one electronic document between the pages of another electronic document. Indeed a combined electronic document may be formed by taking pages from several different electronic documents. An example of how hardcopies of the documents may be manipulated to achieve this is illustrated in FIG. 12. In this example there are a first 147 and a second 149 hardcopy documents which may be, for example, slides, OHP foils, or paper versions of slides or OHP foils, for two different presentations, created and stored separately using, for example, Microsoft™ PowerPoint. Although a PowerPoint presentation is used for illustration, the technique is equally applicable to other types of hardcopy produced by different software applications.

The presentations may have been created by different people or created by the same person at different times. It is common for people to borrow each other's slides and foils and for people to mix and match slides/foils according to the audience of the presentation or according to developments in the subject area of the presentation. An electronic version of the desired presentation may readily be produced by using the digital pen 20 on the hardcopies 147, 14a of the slides/foils.

In FIG. 12 the pages of a first hardcopy document 147 has been given reference numerals 1, 2, 3 and 4 and, for ease of illustration, the pages of a second printed document 149 have been labelled with reference numerals i, ii, iii and iv. The reference numerals are used illustration—they may or may not appear on the actual documents. The user may wish, for example, to insert pages ii, iii and iv of the second document 149 between pages 2 and 3 of the first document 140 (in effect obtaining a merged document containing the first document and selected pages of the second document 142). To obtain an electronic version of the merged document the user, using the digital pen 20, makes a first mark 144a on the page of the first document 147 behind which he wants the inserted pages from the second document to be placed, i.e. the user marks page 2, the user then makes a second mark 144b on the first page of the second document 142 for insertion (i.e., page ii) and the last page of the second document 142 for insertion (i.e. page iv), the user then makes a second mark 150 on the page 2 to complete the insertion.

FIG. 12 illustrates a visual representation of the merged document on the screen 105 of the PC 104. In the case illustrated the screen 105 shows a Microsoft™ PowerPoint presentation of the merged document.

Although, the link marks used in this example take the form a special character 144, any of the other type of link marks 134, 135, 135a, 136, 142 described above can also be used or the digital pen 20 may be used to read the pattern on the pages without contacting the pages, as has been described with reference to FIG. 9.

In a variation of this technique the user may make a mark on each individual page to be inserted—this would be particularly useful if the pages to be inserted in the second document 149 were not sequential. It may not be desirable to have all the pages of the first document 147 and the user need only 'tick' which pages he wants with the digital pen 20.

When the second document 149 has only a small number of pages that are not required in the merged document then one technique would be to mark the first document, mark the second document to indicate that it is for attachment/insertion and then mark pages of the second document, for example with a cross to indicate that these pages should not be attached/inserted. This would remove the need for the user to make an excessive number of link marks.

Figure 13:
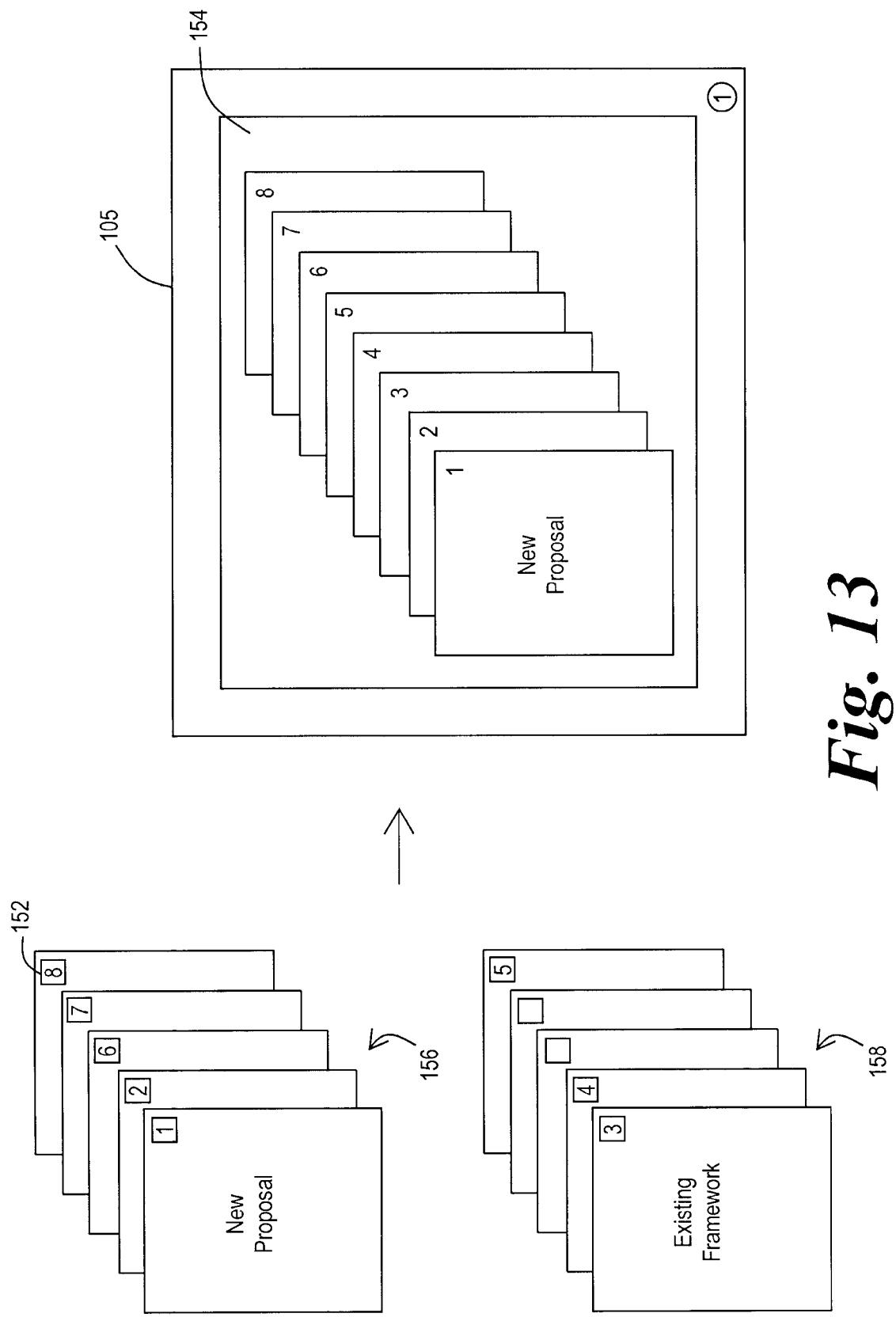
FIG. 13 shows schematically two hardcopy documents that have been numbered with a digital pen and a representation on a screen of an electronic version of a document containing pages, selected according to the numbering, that are electronic versions of pages of the hardcopy documents.

FIG. 13, shows the pages of hardcopy documents each of which are printed with a visible box 152. The box 152 may be of any shape and may be conveniently printed near to the edge of the page. A user may then number the pages by writing a character in the box. The character may by an Arabic numeral, a Roman numeral, a letter or some other character that can be used to indicate a page order. The characters written in the boxes (Arabic numerals are illustrated) identify which pages are to appear in the combined document and the order of those pages. The visible box 152 is not essential for this technique; it is only a guide to assist the user in the placing the numeral or other character in the right area on the page, i.e. an area in which the software will recognise markings as link marks rather than annotations. A user may not wish visible boxes 152 to appear on his documents, because for example they detract from the appearance of the documents, in this case the area of the page having pattern space assigned to link marks may need to be larger than if a visible box 152 were present so as to allow a margin of error for the placement of the numerals/special characters by the user.

Using a worked example, a user has a hardcopy of a document 156 outlining a new proposal, entitled "New Proposal", and decides that at some point in the document 156 there should be an explanation of an existing framework which can be extracted from another document, entitled "Existing Framework" document 158, but does not want to attach the whole of the electronic copy of the Existing Framework document 158 to the electronic copy of the New Proposal document. The user may wish, for example, to have the introduction of the New Proposal document on pages 1 and 2 of the combined document so the user writes the characters "1" and "2" in the boxes 152 on these pages, the user may then want the executive summary of the existing framework as stated in the first few pages of the Existing Framework document so the user writes the characters "3" and "4" in the boxes of the relevant pages of the hardcopy of the Existing Framework document 158 so that these pages appear consecutively after pages 1 and 2 in the combined electronic document. The user may not want the rest of the Existing Framework document (which may, for example, be concerned with fine detail that is not necessary for the combined electronic document) but the user wants a schematic diagram of the existing framework that is toward the end of the Existing Framework document. The user therefore writes the character "5" in the box of the page of the hardcopy of the Existing Framework and this page will then appear next in the sequence of pages in the combined electronic document. The user then writes the numerals "6", "7", "8" the boxes of the appropriate pages of the New Proposal document.

The screen 105 illustrated in FIG. 13 shows a visual representation of the combined electronic document. Of course, the electronic document could be represented on the screen 105 in many different ways (see for example the screen displays illustrated in FIGS. 5 and 12).

The use of "numbering" by writing characters on hardcopy pages would also be useful for the re-ordering of, or selecting from, pages of a single document. This may be particularly useful for slide selection for a presentation, for example a presentation generated on Microsoft™ PowerPoint.

The embodiments of the invention that have been discussed so far have been in relation to the manipulation of whole pages of documents. The invention is also applicable to the manipulation of portions of pages.

Figure 14:
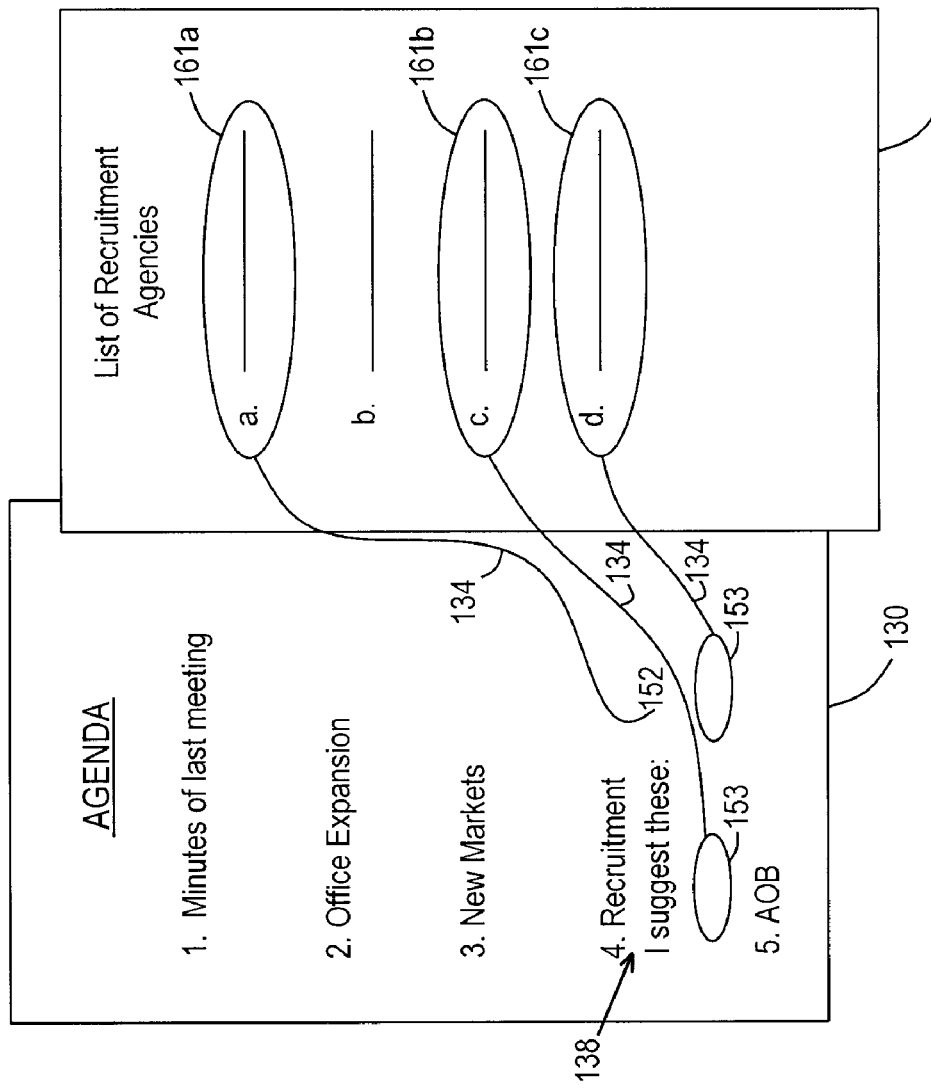
FIG. 14 shows schematically the first hardcopy document and another hardcopy document, the hardcopy documents having link marks linking portion of pages of the electronic version of the other document to the electronic version of the first document.
Figure 15:
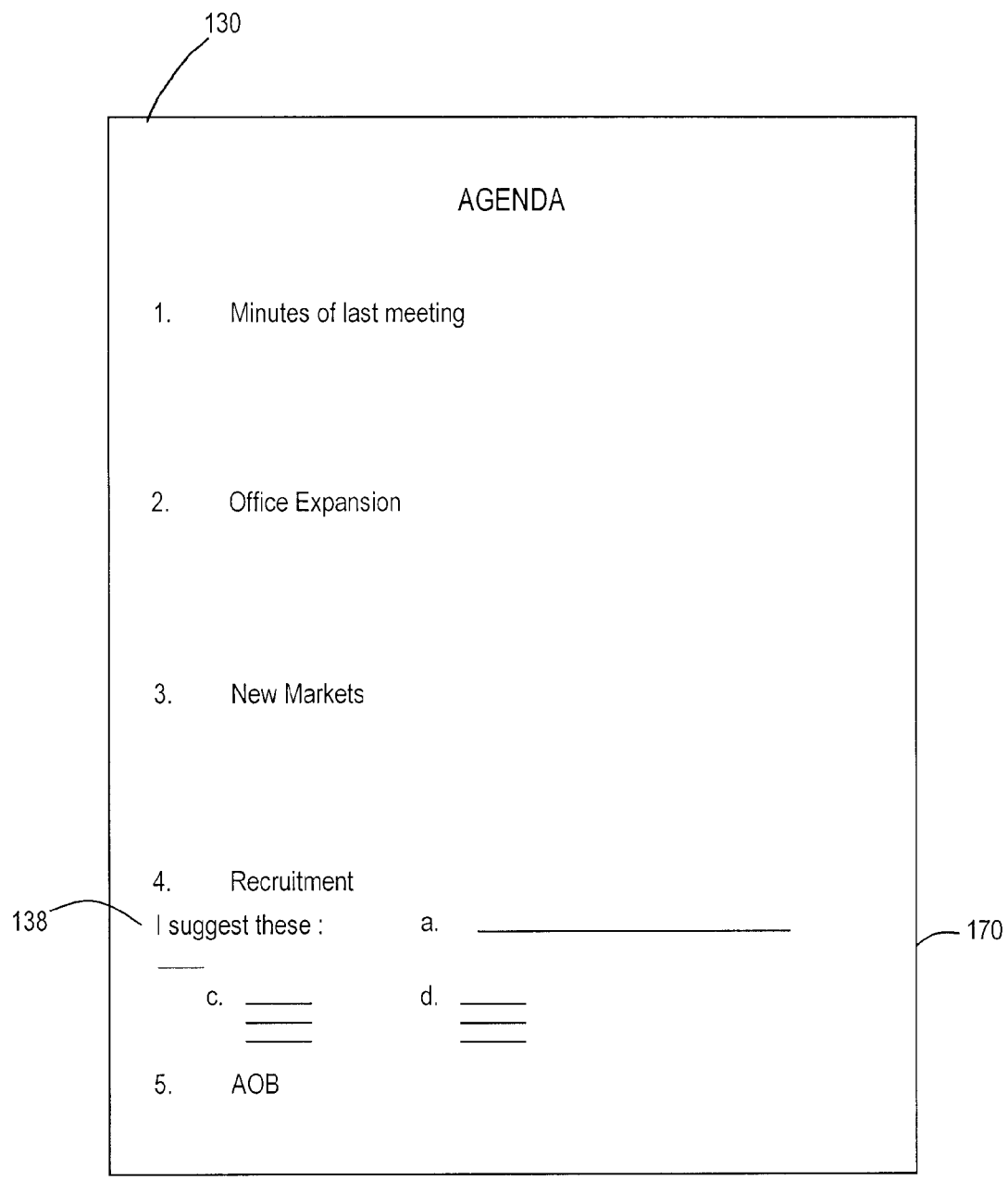
FIG. 15 shows schematically a representation of an electronic document resulting from the link marks on the hardcopy documents illustrated in FIG. 14.

FIG. 14 shows a hardcopy of the agenda document 130 overlapped by a hardcopy document 160 entitled "List of Recruitment Agencies". The user has used the digital pen 20 to write the annotation 138 "I suggest these:" on the agenda hardcopy 130 under the item "4. Recruitment" on the agenda. The user, instead of further annotating the agenda document by writing out a list of his preferred agencies with the digital pen 20, uses the digital pen 20 to circle the preferred agencies detailed on the List of Recruitment Agencies hardcopy 160 and makes link marks 134 so that the encircled information 161a, 161b, 161c will appear on the combined electronic document. FIG. 15 shows a representation of the combined electronic document 170 produced by the link marks 134 as displayed on the screen 105.

The end point 151 of a link mark 134 can be used to indicate the point on the agenda document 130 where the encircled text 161a should be placed. For example, the encircled text 161a will read from left to right on the agenda document starting from the position of the end of the link mark 151. As shown in FIG. 15, if the encircled text 161a will not fit onto a single line of the combined document 170 the text continues onto another line. If there is insufficient space (i.e. blank unused space) for the text to be inserted between agenda item "4." and agenda item "5." on the page of the electronic copy of the agenda document then agenda item "5". et seq. can be pushed further down the page or onto another page if this is required. Alternatively, the inserted text can be resized to fit the space that is available. If the pen-input software is configured with character recognition then the resizing may be performed by inserting the text with a reduced font size.

Although, in reference to the example illustrated, the terms "text" and "encircled text" have been used it will be appreciated that the invention is applicable to any markings (e.g. figures, tables, mathematical equations, chemical formulas etc.).

The link mark 134 may terminate on the agenda document 130 with a loop 153. In this case the encircled text 161b is sized so that it fits within the loop 153. In the example illustrated in FIGS. 14 and 15 two items of encircled text 161b and 161c are placed side by side on the combined electronic document by terminating the corresponding marks with loops 153 that are side by side on the hardcopy of the agenda 130. In this way the user has control over the appearance of the page(s) in the combined electronic document. Since the user is able to view the combined electronic document 170 on the screen 105, the user can reshape/edit how the inserted text appears in the combined document. The user may do this, for example, by cancelling the link marks 134 and redrawing the link marks 134/loops 153 on the hardcopies of the Agenda 130. Alternatively, the user may print out a hardcopy (not shown) of the combined electronic document 170 then encircle the text he wants to edit and then draw another loop or other mark, also on the hardcopy of the combined document, to move or resize the encircled text.

Figure 16:
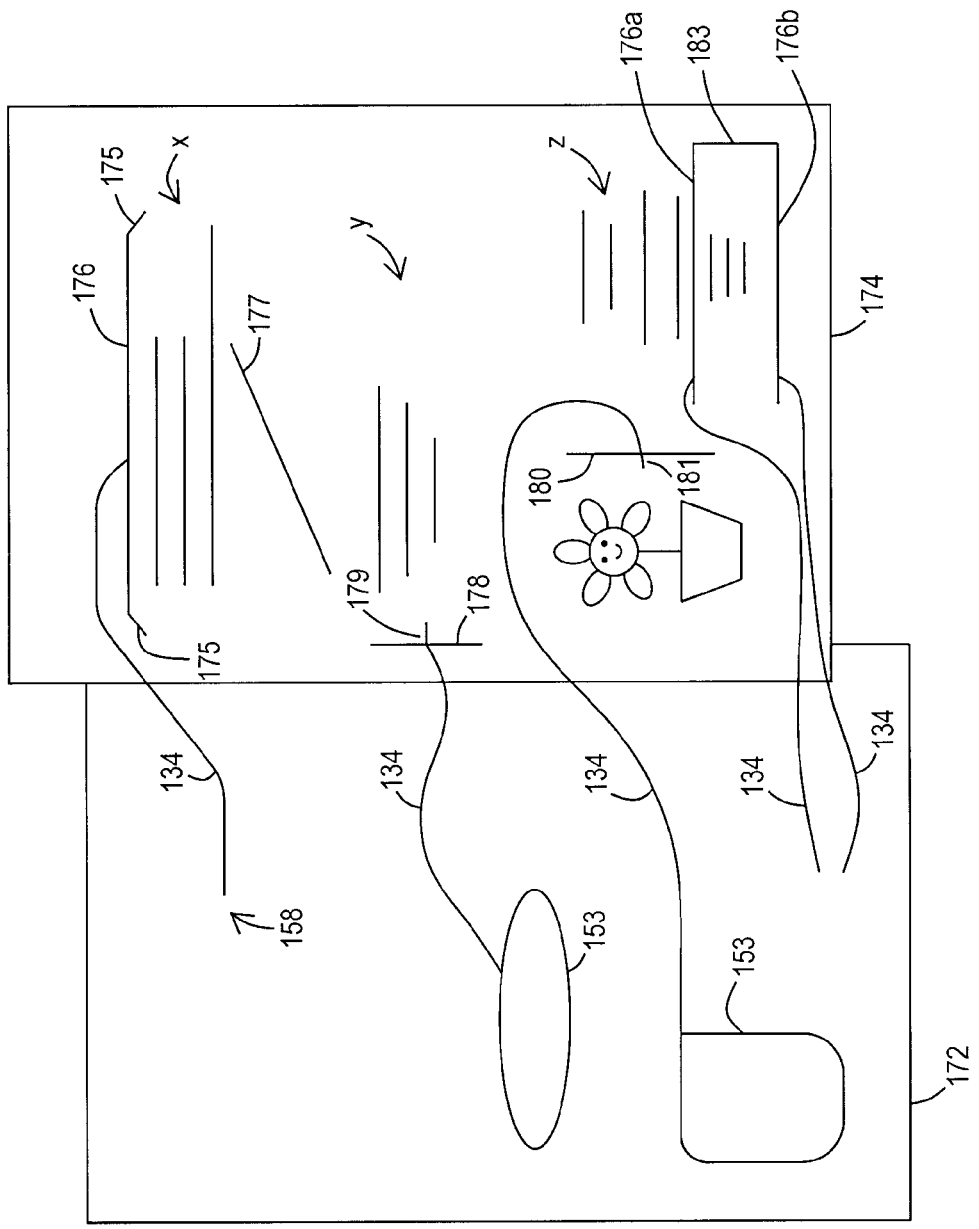
FIG. 16 shows schematically two hardcopy documents with various different link marks.

Instead of encircling text, a line could be used on a hardcopy document to indicate text/markings that are to be inserted or otherwise associated with another hardcopy document. FIG. 16 illustrates a hardcopy 172 of a first document to which text and other markings (a figure in this case) are to be inserted and a hardcopy of a second document 174 which is the source of the text and other markings to be inserted. Of course markings can be inserted into the second document 174 from the first document 172 as well as, or instead of, the other way around. The insertions can be marked in any one of, or a combination of, a number of different ways.

So that the marks that are used to associate or edit documents (e.g. moving, cutting, pasting, copying of text, figures etc.) are not interpreted as annotations the user may first mark an area on the hardcopy document which has been assigned the function "the following marks will be linking/editing instructions", before making the desired linking/editing marks. After completing the linking/editing marks the user then marks an area on the hardcopy document which has been assigned the function "end of linking/editing instructions". Alternatively, the user may activate a switch on the pen when the pen is being used to make linking/editing instructions.

A mark in the form of a horizontal line 176 can be used to indicate that any markings on the page of the second hardcopy document 174 beneath the horizontal line 176 should be inserted into the first hardcopy document 172. Horizontal in this case means in the direction that text is written, or would normally be written, on the page. The horizontal line 176 does not have to be exactly horizontal, the horizontal line 176 can be at an angle to the horizontal and all that is necessary is that the horizontal line 176 can demarcate markings that are above and beneath the line 176 on the page. For example the diagonal line 177 will demarcate the text labelled 'x' from the text labelled 'y' on the second hardcopy document 174, and can be thought of as a 'horizontal line' for the purposes of this embodiment of the invention.

The horizontal line 176 can also be used to indicate that any markings above the line 176 should be inserted. Whether, it is markings that are above the line 176 or beneath the line that are inserted can be set by the software or can be an optional feature of the software that is chosen by the a user input into the PC 104 via, for example by the keyboard 106 or mouse 108. Alternatively, the user may indicate whether, it is markings above the line or beneath the line that are inserted by use of a modified horizontal line 176. For example, as is illustrated in FIG. 16, the horizontal line 176 has been modified with one or more downwardly extending portions 175 so that text that is beneath the horizontal line 176 is inserted. Similarly, upwardly extending portions (not shown) can be used to indicate that it is text that is above the horizontal line 176 that are intended for insertion.

Another technique is to use two horizontal lines 176a, 176b to indicate that markings between the horizontal lines 176 should be inserted. In this case it would be necessary to have a link mark 134 for each horizontal line 176, or, to avoid the need for two link marks, the two lines 176a and 176b can be joined by another line 183 so that the lines 176a, 183 and 176b bracket the text to be inserted.

The horizontal line 176 may extend across the whole width of the markings that are beneath (or above) the line 176 or just for a portion of this width. If the horizontal line 176 only extends across a portion of the width then the software can be configured to either insert either all markings that are lower (or higher) on the page than the line 176, e.g. markings that run across the whole width of the page, or just the marking that are actually (or above) the width of the line 176. The second option would be particularly useful for desktop publishing applications where text, figures etc may be organised as columns across the width of the page and only certain columns are required for insertion.

A vertical line 178, 180 can be used to indicate that markings that are either to the left or to the right of the vertical line 178 are to be inserted. The vertical line 178, 180 does not have to be exactly vertical, the line 178 can be at an angle to the vertical and all that is necessary is that the line 178, 180 can demarcate markings that are to the left of the line 178, 180 from markings that are to the right of the line 178, 180 on the page. In a manner similar to that discussed for the horizontal line 176, whether, it is markings to the right or to the left of the vertical line 178, 180 that are to be inserted can be indicated by a modified vertical line 178, 180, can be set by the software or can be an optional feature of the software that is chosen by a user input into the PC 104.

A first example of a modified vertical line 178 has a portion 179 that extends towards the right to indicate that markings to the right of the vertical line 178 are for insertion. A second example of a modified vertical line 180 has a portion 181 that extends towards the left to indicate that markings to the left of the vertical line 178 are for insertion. Therefore, the modified vertical line 180 would cause the figure of a flowerpot in the second document 174 to be inserted into the first document 172 but not the text labelled 'z'.

It is not necessary for the horizontal 176 and vertical 178, 180 lines to be straight lines.

The bracket formed by horizontal lines 176a and 176b and joining line 183 can be in fact be orientated in the vertical direction to indicate text to be inserted. The bracket need not be made up of straight lines and can be formed by a single curved line.

FIG. 17 illustrates the use of specific characters as link marks for inserting portions of a page of one document into a page of another document. In the example shown in FIG. 17, there is a hardcopy of a letter 190 and a hardcopy of a design document 192. Portions of the design document 192 may be inserted into the letter by using the digital pen 20 to select the required portions using loops, lines or brackets (or a combination of these) as outlined above and a special character 194 that is drawn/traced so that it is connected to the loops, lines or brackets. The special characters 194 are also drawn/traced on the hardcopy of the letter 190 so as to link the insertions from the electronic version of the design document to the electronic version of the letter document. The special characters 194 on the hardcopy of the letter 190 also indicate the position that the insertion should be made on the letter 190.

The special characters 194 illustrated take the form of an inverted Y-shape, but the special characters 194 could take one of many different forms. The inserted markings can be inserted at a position on the letter 190 starting from the position of the special character 194, for example, the special character could define the top left position of the insertion markings or the centre of the insertion. Alternatively, the inserted markings can be inserted into a region of the letter defined by a loop 150 drawn/traced to connect with the special character 194 on the hardcopy of the letter 190.

Figure 18:
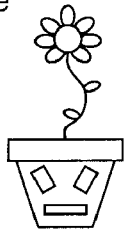
FIG. 18 shows schematically a representation of an electronic document resulting from the link marks on the hardcopy documents illustrated in FIG. 17.

FIG. 18 illustrates a hardcopy of a combined electronic document produced by the link marks 194 on the hardcopy documents 172, 192 illustrated in FIG. 17.

Figure 19:
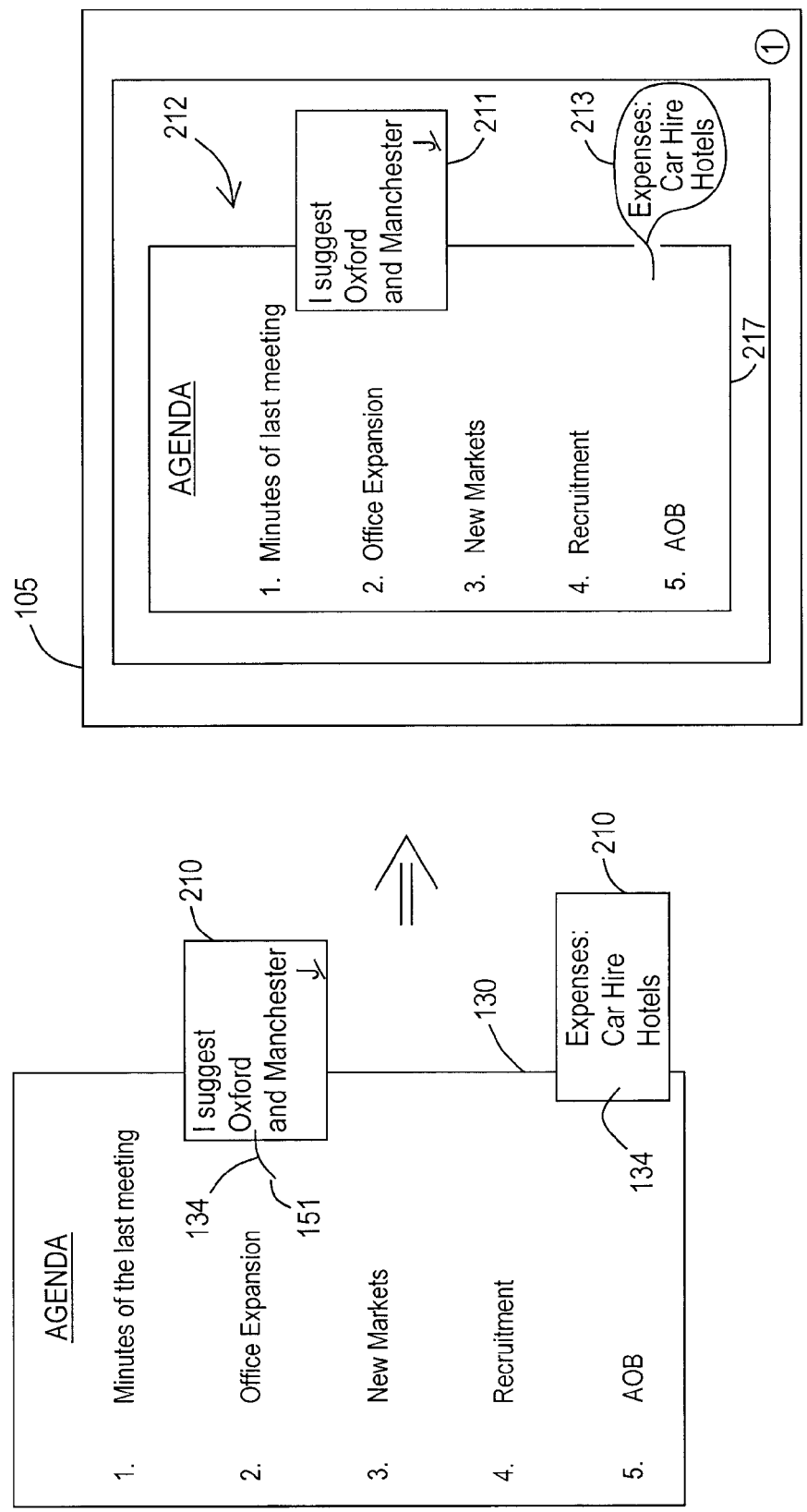
FIG. 19 shows schematically the first hardcopy document, adhesive notelets stuck the first hardcopy document, and a representation on a screen of an electronic document resulting from link marks on the first hardcopy document and the adhesive notelets.

FIG. 19 illustrates a hardcopy of the agenda document 130 to which adhesive notelets 210 (for example notelets similar to Post-it™ notes) have been stuck. A dot pattern 12 has been printed on the adhesive notelet 210 so that the notelet 210 can be used as digital paper. In one embodiment the dot pattern on each notelet 210 to is unique to that notelet 210 so that the notelet 210 can be identified by the software when the pattern 12 on the notelet is read by the digital pen 20. When a user writes or otherwise marks a notelet 210 with the digital pen 20 the markings are recorded by the PC 104 so that there is an electronic document corresponding to the markings on the notelet 210. The electronic version of a notelet can be associated with the electronic version of the agenda using link marks in the same way that has been described above. When a notelet 210 is stuck to the agenda 130 then it is convenient to make a link mark 134 by tracing the digital pen from the notelet to 210 to the agenda 130 (or vice versa) as is shown in FIG. 19.

In another embodiment each post-it note, or at least a plurality of them, have the same pen-readable position-determining pattern on them and there is also a way of indicating that a new note is being written (e.g. a "New Note" checkbox on each post-it note, or on a command panel/sheet, or a "New Note" button/switch on the pen). This enables a user to associate content previously written on a particular note, or to be written in the future, typically immediate future, on a particular post-it note. For example a user could tick the "New Note" checkbox, write content upon a post-it note, overlay the edge of the note against a position on a paper document where the user wants to see the content of the post-it note reproduced electronically, and draw a line extending from the post-it note the underlying page, or from the page to the note. Of course, that note may underlie the page. The system may have an "active document awaiting association" memory, or file, and may associate electronic documents in that file (e.g. the user-applied new writing they have just written on the post-it note) to wherever/to whatever different electronic document the pen next sees during a linking operation/command. Once a link has been effected, the temporary "active document awaiting association" memory may be wiped to leave it free and clean for the next document. The "active document awaiting association" memory may comprise an "active document awaiting action" memory: the action may be linking, but it could be a different action, e.g. e-mailing.

FIG. 19 also illustrates a representation of the combined electronic document 212 on the screen 105. The representation of the combined document 212 corresponds to the appearance of the notelets 210 stuck to the hardcopy of the agenda document 130, in some embodiments in a What You See Is What You Get (WYSIWYG) way, possibly even the colour of the notelets, and including their relative position of the notelets on the main document. A hardcopy of the combined document may then be produced. On the combined document a notelet 210 may be represented as a rectangle 211 (e.g. of the same size relative to the main physical document 130 and possibly the same colour as the physical notelet). Alternatively, WYSIWYG may not be carried that far and a bubble 213 or other graphic that encloses or partially encloses the markings on the notelet 210 could be used. The use of a bubble may be convenient since the shape and relative size of the bubble 213 could be made to match the shape 213 and size of the text or other markings made on the notelet 210. In this way space is saved on the screen display and in the hardcopy of the combined document (i.e. it is not necessary to display unused parts of the notelet).

The point at which the link mark 134 made by the digital pen goes from the notelet 210 to the agenda 130, or the termination point 151 of the link mark 134 on the agenda 130, can be used determine the position of the rectangle/bubble 211/213 with respect to the representation of the agenda document 217.

Figure 19A:
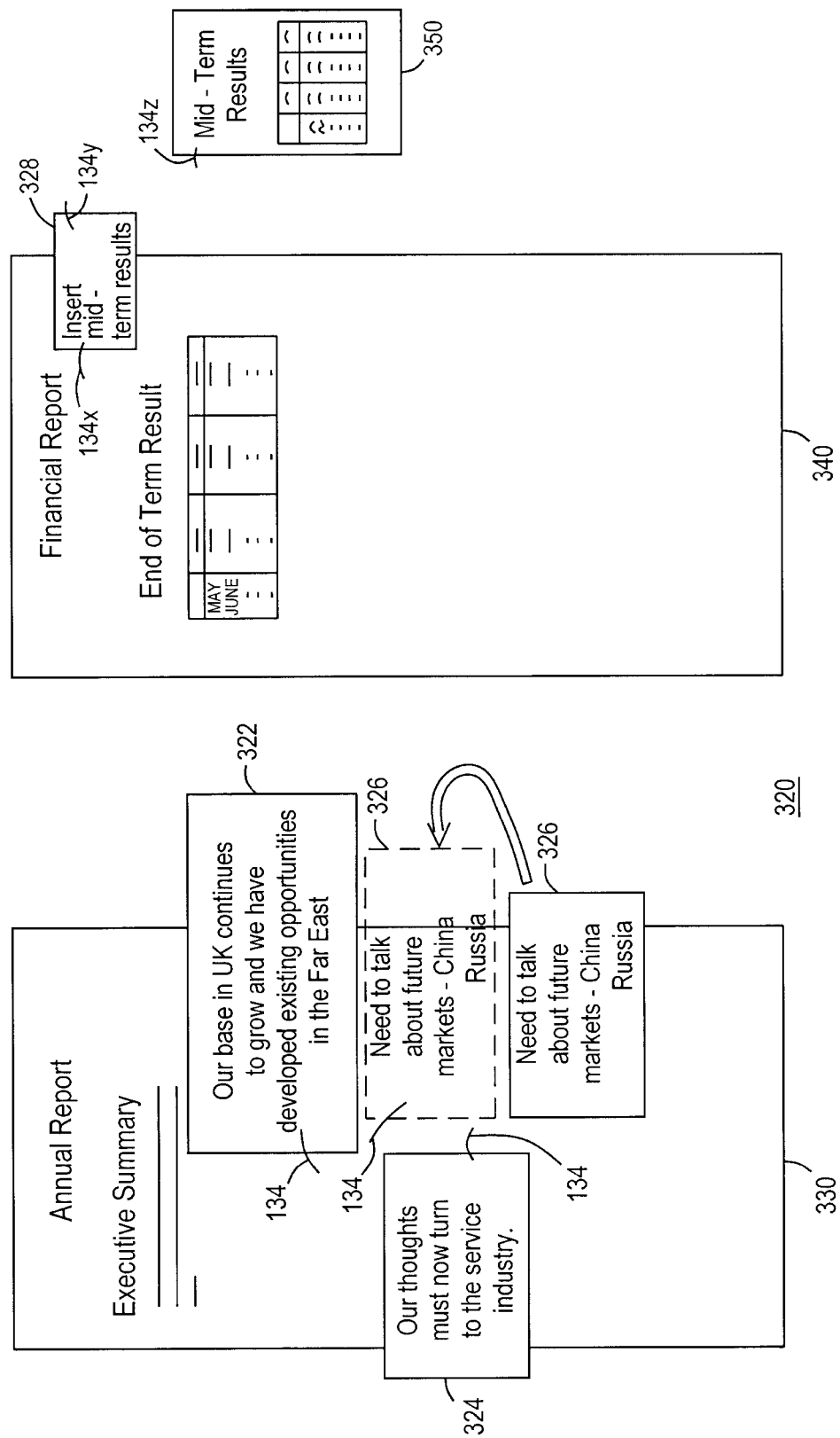
FIG. 19A shows schematically a hard copy of a draft annual report to which several adhesive notelets have been attached.

FIG. 19A illustrates a hard copy of a draft annual report 320 to which several adhesive notelets 322, 324, 326, 328 have been attached. The hardcopy of the draft annual report 320 includes a page with the heading "Executive Summary" 330 and a page with the heading "Financial Report". A combined electronic document is then formed by making link marks/pen traces on the hardcopy draft report and the notelets 322, 324, 326, 328. The notelets may have text (or other markings) that is to appear in the final copy, or a further draft, of the annual report, for example the text "Our base in the UK continues to grow and we have developed exciting opportunities in the Far East", which is written on notelet referenced 322, is intended to appear in the final copy of the report. The notelets may have text that act as a reminder to place further information into the report, for the example the text "Need to talk about future markets—China Russia?" will appear in the combined electronic document as a note to the user to add-in the information as set out in the notelet 326.

There may be several, or even several dozen (or more) notelets that are stuck to the hardcopy of the annual report 320. A user may un-stick and re-stick the notelets to rearrange the notelets on the page. The user may do this several times until the user is happy that the notelets are in the position that he wants them on the page. For example the notelet referenced 326 which concerns future markets has been moved so that it is beneath the notelet 322 which concerns opportunities in the far east. When the user is happy with the layout of the notelets on the printed pages the user makes link marks 134 to associate the content of the notelets with the hardcopy of the draft annual report 320.

Copies of the draft annual report may have been distributed to several different people, for example various different executives and managers in a company, for comments and other contributions. Each contributing person writes out his contribution on notelets that have been printed with a dot pattern and sticks the notelets at the appropriate position on his hardcopy of the annual report.

In a first technique, the contributor then gives his hardcopy, with the notelets stuck on to it, to the main author, issuer, or 'owner' of the annual report, who may be, for example, the chief executive officer of the company or the company's head of corporate communication. The hardcopies of the draft annual report used by the various contributors need not have a dot pattern since in this technique the association of the notelets with the draft annual report is done by the main author/issuer/owner of the report by manipulation of the notelets on his "master" hardcopy of the draft annual report, the master hardcopy being printed with the dot pattern.

In a second technique, each of the contributors has a hardcopy of the annual report 320 that is printed on digital paper 10, the contributor then places his notelets on the hardcopy 320 and associates the electronic version of the notelets to the electronic version of the hardcopy by making link marks 134, thereby producing a combined electronic document. The dot pattern that is read by the digital pen 20, when a link mark 134 is made an individual notelet, can be used to identify the size and shape of that notelet. The position of the link marks 124 on the hardcopy of the annual report 320 can be used to determine the position of the notelet on the hardcopy of the annual report. Therefore, the combined electronic document can be produced in such a way so as to provide a WYSIWYG presentation of the notelet on the annual report. That is, the combined electronic document may have the following WYSIWYG features: the size of the notelets relative to the size of the sheets of the annual report, the shapes of the notelets and the sheets of the annual report, and the positions of the notelets on the annual report. All these WYSWIG features may be used or just one or more of the features may be used.

Each contributor may email the combined electronic document that they have produced to the main author/issuer/owner of the annual report for collation. The main author/issuer/owner will therefore receive several different combined electronic documents, each of these being an electronic version of the same annual report but with electronic versions of different notelets. The main author/issuer/owner may then move the electronic versions of the notelets onto a master electronic copy of the annual report. This may be done, for example, by clicking and dragging the representations of the notelets on the screen or by cutting and pasting them. Software such as Acrobat, or an equivalent, may be used to export comments from one document (electronic) to another electronic document, and/or to import comments into an electronic document from other electronic documents (e.g. when an author of a main electronic document is importing content from other electronic documents (e.g. comments from multiple reviews of a draft of the main electronic document)).

Instead of e-mailing the combined electronic document a user may store the combined documents in a folder that is accessible to the main author/issuer/owner via the local network 109 or the Internet 114. In this way, several versions of the combined electronic copy may be stored, each version being produced by a different contributor. Alternatively, when each contributor links his notelets to the annual report this updates a single master electronic copy of the annual report.

The notelets 322, 324, 326, that are shown stuck to the page with the heading "Executive Summary" 330, may have, for example, originated from a marketing director and the notelet on the page with the heading "Financial Report" 340 may have, for example, originated from a financial director. The notelets that originate from different people may be different colours or may have some other visually identifying feature (for example, each notelet may be watermarked with the name or initials of the person from whom the notelet originated) so that the main author/issuer/owner can readily see which notelets have come from which people. The colour (or other visually identifying feature) of the notelets may be reproduced in a WYSIWYG manner in the representation of the combined electronic document on the screen.

The notelets may be used to link other documents to the main annual report document. For example the hardcopy of the Financial Report page 340 has a notelet 328 having a link 134$x$ that associates the electronic version of notelet to the electronic version of the draft annual report, and a further link mark 134$y$ that links the notelet 328 to another document, which, in the example illustrated, is entitled "Mid Term Results". The notelet mark 134$y$ may be part of a link mark 134$y$, 134$z$ that was a made by passing the pen across the both the notelet 328 and the hardcopy of the Mid Term Results document 350 or the Mid Term Results document is linked to the notelet using two separate link marks 134$y$, 134$z$, one that is made on the notelet 328 and one that is made on the hardcopy of the Mid Term Results document 350. In this way the mid term results document is associated with the electronic version of the draft annual report. Similarly, link marks can be made to the notelet 328 to attach the Mid Term Results document to the back of the annual report document instead of inserting it into the body of the annual report. The notelet 328 has the text "insert mid term results" so that the function of the notelet 328 can be easily determined.

FIG. 20 illustrates a first example hardcopy 224 of the combined electronic document. The first example hardcopy 224 is a faithful reproduction of the appearance of the hardcopy agenda and hard copy notelet 210 what is displayed on the screen 105 as illustrated in FIG. 19. If the first example hardcopy 224 is a sheet of paper that is the same size as, or smaller than the hardcopy of the agenda 130 then the appearance of the agenda and the representation of the notelet 211 on the first example hardcopy 224 would be in proportion smaller than the corresponding hardcopies of the agenda 130 and the notelet 210. On the other hand if the hardcopy of the combined document is larger than the hardcopy of the agenda 130 (for example it the hardcopy of the combined document is an A3 or A4 sheet of paper and the hardcopy of the agenda 130 is an A4 or A5 sheet of paper respectively) the appearance of the agenda and the representation of the notelet 211 on the paper could be the same size or larger than the corresponding hardcopies of the agenda 130 and the notelet 210.

FIG. 21 illustrates a second example hardcopy 225 of the combined electronic document. In this example 225 the representation of the notelet 221 on the hardcopy has been moved into the representation of the Agenda 217 as far as is possible without obscuring the text/markings of the Agenda. It will be possible to move the representation of the notelet 221 at least up to the margin of the text/markings in the representation of the Agenda 217, and if there are gaps in the text/markings of the representation of the Agenda 217 then the representation of the notelet 221 can be moved further into the representation of the agenda 217. The user can control the position of the representation of the notelet 221 relative to the representation of the agenda 217 by dragging the representation of the notelet 221, for example via the mouse 108, on the screen 105 before the hardcopy 225 is printed.

Figure 21A:
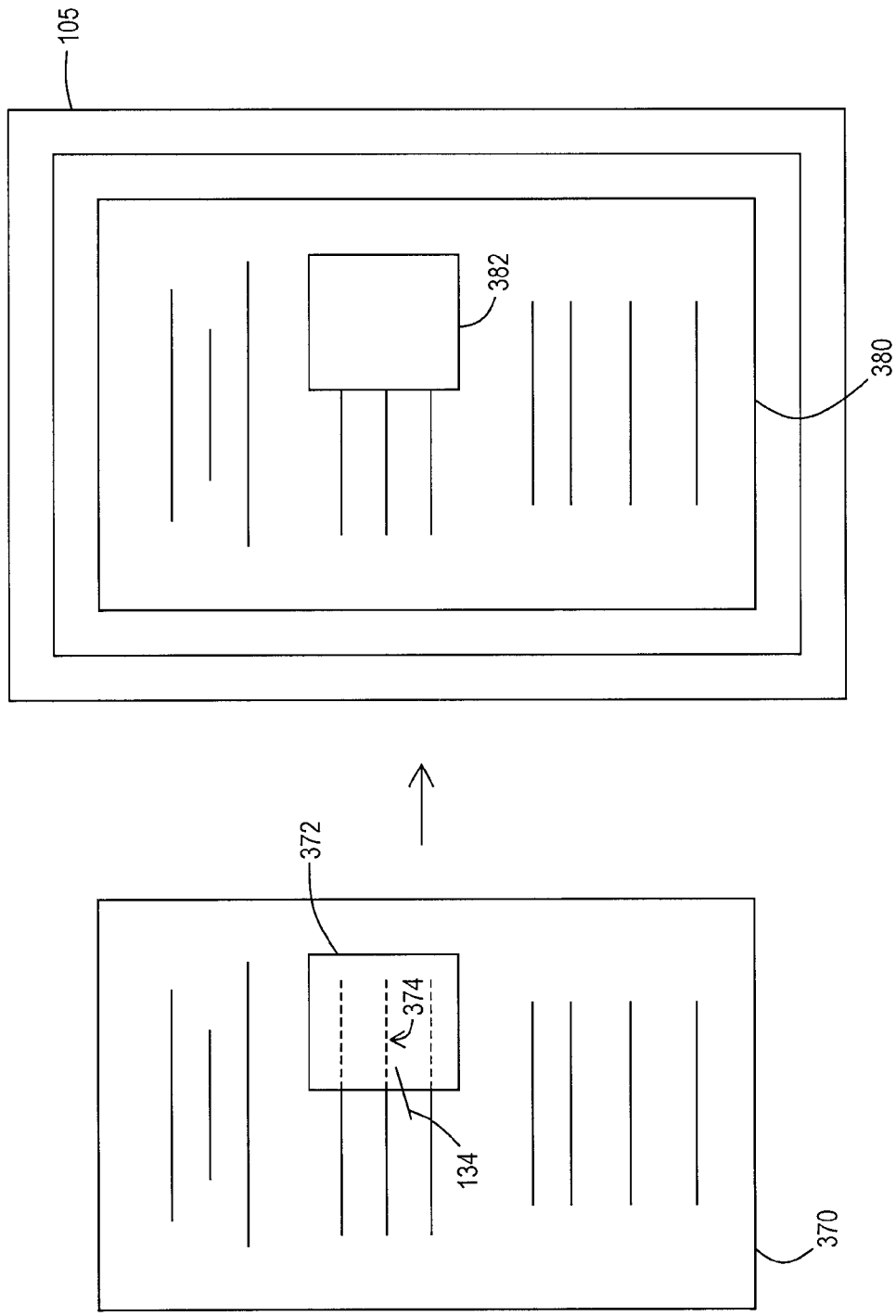
FIG. 21a illustrates an example of a hardcopy document and an adhesive notelet which has been stuck on the hardcopy document in such a way that the notelet covers text or other markings on the hardcopy document.

FIG. 21a illustrates an example of a hardcopy document 370 on which has been stuck an adhesive notelet 372. The notelet 372 has been placed on the hardcopy document 370 in such a way that is covers text or other markings on the hardcopy document 370. The text/markings 374 that have been covered by the notelet are illustrated as dashed lines. A link mark 134 has been made to associate the electronic version of the hardcopy document with the electronic version of the notelet to form a combined electronic document. FIG. 21a also shows a representation of the combined electronic document 380 on the computer screen 105. The representation 380 is a WYSIWYG representation of the hardcopy versions of the document 370 and notelet 372. The representation 380 includes a representation the main hardcopy document and a representation of the notelet 382. The representation of the notelet 382 is in the correct position relative to the representation the main hardcopy document and the text/markings 374 that are covered by the notelet 372 do not appear on the screen.

The user can use the mouse 108, the keyboard 106 or some other input device to move the representation of the notelet 382 around the screen so as to reveal the text/markings 374 that were "hidden" under the representation of the notelet 282. Alternatively the user can select the representation of the notelet 372, for example by clicking or double clicking on it with a mouse, to make the representation of the notelet invisible or only partially visible (e.g. by displaying a small icon that does not cover, or covers less of, the text/markings of the main document that were initially hidden). The mouse 108 or keyboard 106 can be used to toggle between a screen display in which the representation of the notelet 382 is fully visible (in the WYSIWYG representation) or is invisible or only partially visible. In a further alternative (not illustrated) the representation of the notelet is automatically moved to the edge of the representation of the combined document 380 so that the text/markings that were under the notelet are displayed. In this case the position of the hardcopy notelet 372 can be represented by, for example, a dotted line, shading or corner brackets.

FIG. 22 illustrates a third example hardcopy 226 of the combined electronic document. In this example 226 the representation of the notelet 221 on the hardcopy 226 has been moved into the representation of the Agenda 217 by resizing the representation of the notelet 211 so that it does not obscure the text/markings of the agenda. In this way the representation of the notelet 211 can be fitted into gaps in the text/markings of the representation of the agenda 217. The user can control the size of the representation of the notelet 211 by dragging a corner of the representation of the notelet 211, for example via the mouse 108, on the screen 105 before the hardcopy 226 is printed.

The user may be able to change both the size and position of the representation of the notelet 211 on the hardcopy 224, 225 by manipulating the representation of the notelet 211 on the screen 105, for example via the mouse 108, before the hardcopy 226 is printed. The representation of the notelet 221 could also be reshaped, for example from square to rectangular (or vice versa) or to some other shape.

If there is insufficient space (i.e. blank unused space) for the text on the markings at the appropriate position on the page of the electronic copy of the agenda document then agenda item below the insertion point can be moved further down the page or onto another page if this is required.

The notelets 210 need not be stuck to the hardcopy of the document to which they are to be associated. FIG. 17 illustrates a notelet 210 which is to be associated with the electronic version of the letter 190. In this case the electronic version of the notelet 210 is associated with the electronic version of the letter 190 using a special character 194, but the other ways of linking documents that have been discussed are also applicable (e.g. a non-adhesive notelet may be written on, positioned on the main page, and a link mark drawn from the notelet to the page).

If there are a large number of notelets 120 to be associated with a main document then it would be convenient for a user to have a hardcopy of the main document laid out, for example on a desk or table, with the notelets 120 stuck on the desk/table around the hardcopy of the main document. The user may then easily arrange the notelets 120 on the desk/table and link the notelets 120 to the main document with link marks.

FIG. 23 illustrates a notelet 120 stuck on a hardcopy of a first document 220 and a hardcopy of a second document 222. A digital pen 20 is then used to combine the electronic version of the notelet, or a portion thereof, with the electronic version of the first document. The digital pen 20 is then used to make link mark(s) on the hardcopy on the first document and a hardcopy of the second document 222. The electronic versions of the notelet and the first and second documents are then associated together. Of course the association of the documents may be achieved by making the link marks 134 in a different order.

Figure 24:
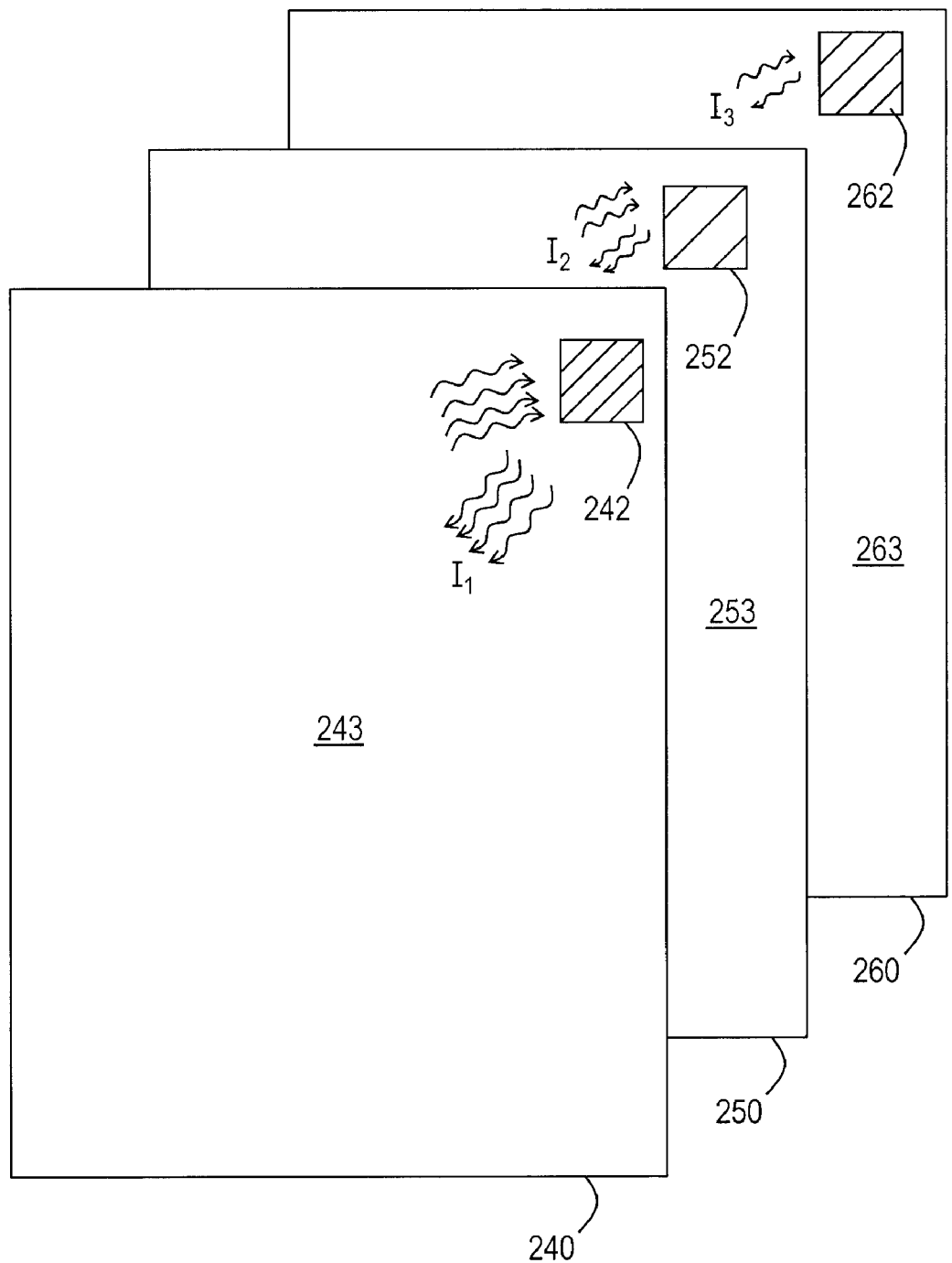
FIG. 24 shows schematically three hardcopy documents each document has an area of dot pattern that uniquely identifies the document.

FIG. 24 illustrates three hardcopy documents 240, 250, 260 each document 240, 250, 260 has an area of dot pattern 242, 252, 262 that uniquely identifies the document. The remainder the area of the hardcopy sheets 243, 253, 263 may or may not have a dot pattern 12. If the hardcopy documents are to some extent transparent to infrared light then it is possible to read the identifying areas of dot pattern 242, 252, 262 through sheets of the hardcopy documents. A digital pen 20 can, therefore, be used to read the dot patterns when the hardcopy documents 240, 250, 260 are in a stack and hence the electronic versions of hardcopy documents 240, 250 and 260 can be associated. In this way the digital pen 20 acts as a digital equivalent of a stapler, without having to fan the pages to enable the pen to read the exposed surface of each page. Any electromagnetic wavelength that can "see through" the pages could be used in conjunction with ink that differentially reflects/absorbs that wavelength (compared with the material of the pages).

Figure 25:
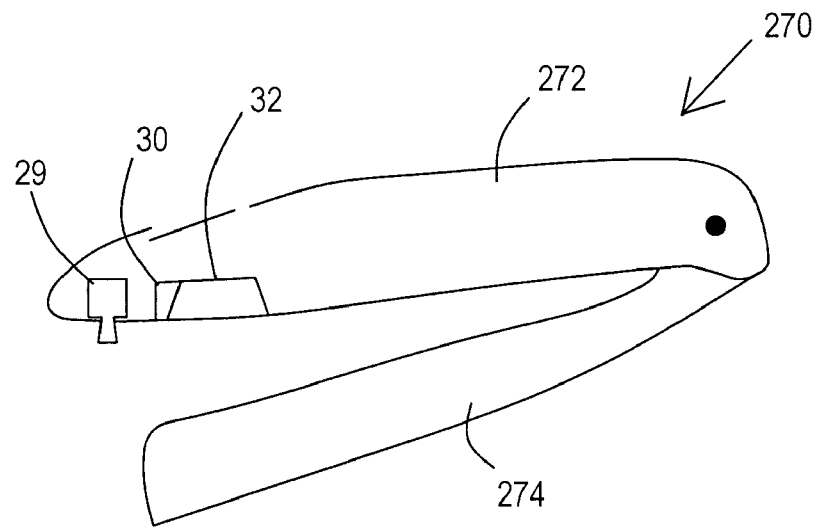
FIG. 25 shows schematically a first form of a digital stapler.
Figure 26:
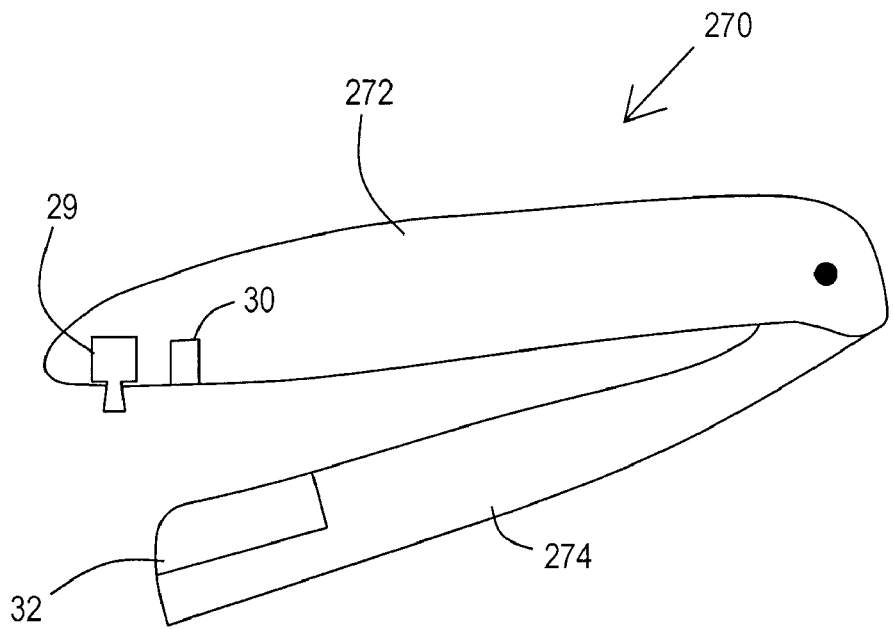
FIG. 26 shows schematically a second form of a digital stapler.

It is not necessary for the digital pen 20 to make marks on the paper 10, therefore some other device that reads the dot pattern may be used instead of a digital pen. Such a device may be in a form that takes the appearance of a conventional stapler, i.e. it has two arms that are hinged so that paper documents can be placed between the two arms 272, 274, this device may be termed a "digital stapler" and is illustrated in FIGS. 25 and 26. The digital stapler has a pressure sensor 29 that is activated be pressing the two arms 272, 274 of the stapler together to trap paper there between in an action that is akin to the action of a conventional stapler. The pressure sensor 29 activates an LED 30 that emits infra-red light so that the dot pattern 12 on the sheets between the arms 272, 274 is read. The pressure sensor 29 may protrude from either of the arms 272, 274.

FIG. 25 illustrates a first form of a digital stapler 270. In this form the LED 30 is positioned on one arm 272 and on the same arm 272 there is positioned an infra-red sensitive camera 32. The camera 32 detects infra-red light that has been reflected from the digital paper 10 in a similar manner of operation as the digital pen 20.

FIG. 26 illustrates a second form of a digital stapler 270. In this form the infra-red sensitive camera 32 is positioned on a different arm 274 to the arm 272 on which the LED 30 is positioned. The camera 32 detects infra-red light that has been transmitted through the digital paper 10 as a means to detect the dot pattern 12. In the second form of the digital stapler 270 the image produced by the camera 32 would be the negative of the image produced by the camera 32 in the first form of the digital stapler 270.

In a third form of the digital stapler 270 (not illustrated) there is an LED 30 on one arm of the stapler 270, 274 and there are two cameras 32—one on each arm of the stapler. In this way the dot pattern 12 may be read by both infra-red light that is reflected from the paper and infra-red light that is transmitted through the paper. The outputs from the two cameras 32 can be correlated to reduce errors in the reading of the dot pattern 12.

It is necessary for the pen-input software to be able to deconvolute the parts of the camera image that are produced by different sheets of paper in order for the correct dot pattern to be assigned to the correct hardcopies and hence for the correct electronic documents to be identified. One method of doing this is to relate the intensity of the infra-red light received by the camera 32 to the hardcopy the infra-red light has been reflected from. Referring again to FIG. 24, the infra-red light reflected from the dot pattern area 242 on the first hardcopy document 240 would have the highest intensity $I_1$, the infra-red light reflected from the dot pattern area 252 on the second hardcopy document 250 would have a lower intensity $I_2 > I_1$, since the infra-red light is absorbed by the first sheet 240 on both the incident light path and the reflected light path, and the infra-red light reflected from the dot pattern area 262 on the third hardcopy document 260 would have the lowest intensity $I_3 > I_2$, since the infra-red light is absorbed by both the first 240 and second 250 sheets on both the incident and the reflected light paths. The intensity of the light received by the camera 32 drops off as an exponential function of the number of sheets. Intensities measurement of transmitted light could also be used (as well as or instead of reflected light intensities) to distinguish between the dot patterns from the different sheets.

Figure 27:
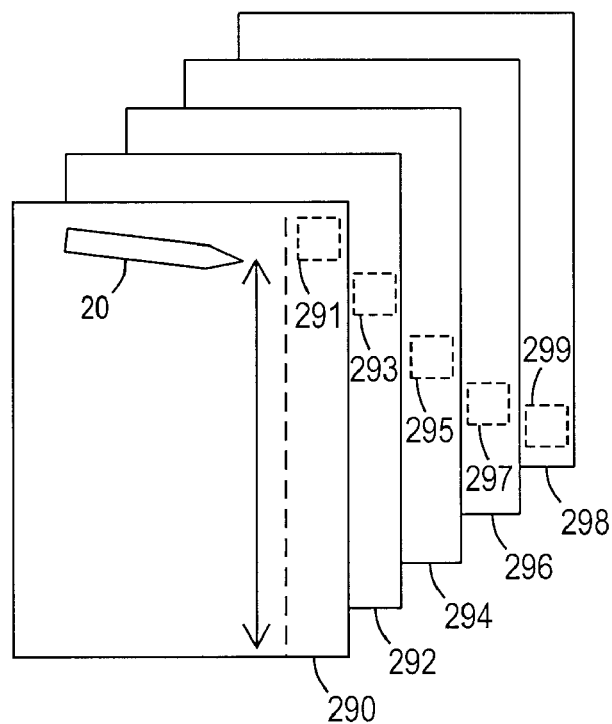
FIG. 27 shows schematically a number of hardcopy documents in a stack, each document having an area of dot pattern.
Figure 28:
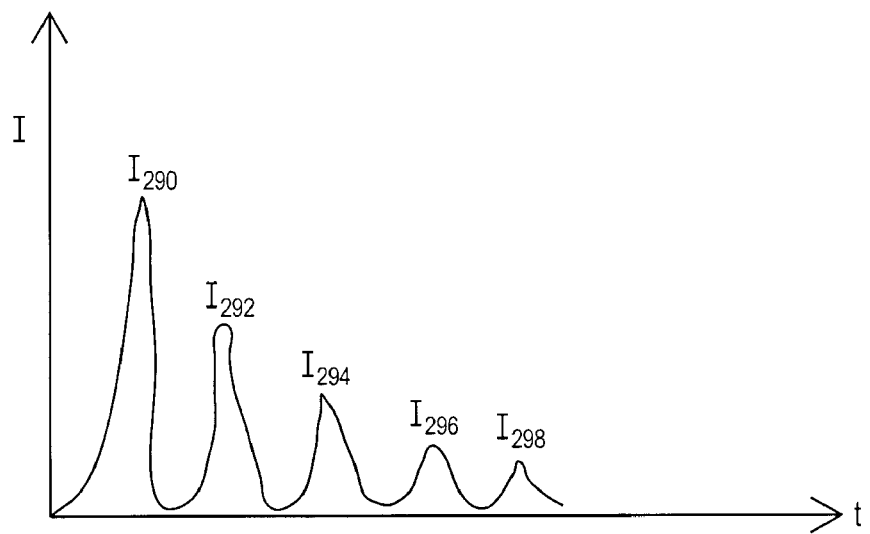
FIG. 28 is a graph illustrating the intensity of light entering the pen camera as a function of time as the pen is traced along the edge of the stack of documents illustrated in FIG. 27.

FIG. 27 illustrates a number of hardcopy documents 290, 292, 294, 296, 298 in a stack, each document having an area of dot pattern 291, 293, 295, 297, 299 that uniquely identifies the document. The hardcopy documents are to some extent transparent to infra-red light so that the areas of dot pattern can be read through sheets of paper. To enable the correct dot pattern to be assigned to the correct individual hardcopy 290, 292, 294, 296, 298 each hardcopy has its area of dot pattern 291, 293, 294, 296, 298 in a different place on the hardcopy to the other hardcopies, for example each document has the identifying pattern at a different position at an edge of the document. FIG. 28 is a graph illustrating the intensity of light entering the pen camera 32 as a function of time as the digital pen 20 is traced along the edge of the stack of documents illustrated in FIG. 27. As the digital pen 20 is traced along a line on the face of the top document in the stack of documents the dot patterns identifying the documents are be read off sequentially. The number of different documents that can be associated by this technique is limited to the number of identifying areas that can be placed along an edge of a hardcopy without the areas overlapping. There should also be a sufficient gap between the areas to allow for misalignment of the documents in the stack. In a variation of this technique the whole page of a hardcopy document is available for the placement of an identifying area, in this case the dot pattern may be read by a scanner type instrument that scans the page (for example a device similar to a flat-bed scanner or a wand scanner). This would allow a greater number of different positions for the identifying pattern.

Figure 29:
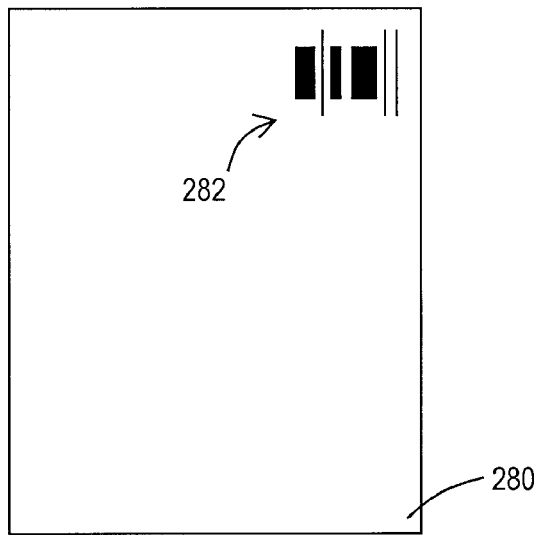
FIG. 29 shows schematically a hardcopy document having a barcode.

Although embodiments of the invention are well suited to use of Anoto digital paper 10 the use of such paper is only one way of realising the invention. The invention can realised by using other techniques in which hardcopy documents are identified to enable the electronic versions of those documents to be associated. On such technique is to have bar codes, on the hardcopy documents. FIG. 29 illustrates a hardcopy document 280 having a barcode 282 present in an area of the document 280. The barcode may be a similar to a barcode 282 present on the packaging of retail items (e.g. grocery items, so the barcode may be read at the point of sale to give the price and identity of the item). Such barcodes are visible to the human eye, i.e. the barcode absorbs light in the visible region of the electromagnetic spectrum, and have the appearance of a number of spaced parallel black lines of various thickness. The barcodes are generally read using a laser and photodetector. A number of bar-code readers are known and include pen wand, slot scanners, CCD scanners, image scanners and laser scanners. It is not necessary for the barcode 282 to be as large as those used in point of sale applications and the barcode 282 may only be a few millimetres across.

The barcode 282 may also take a form that absorbs infra-red light. In this case the barcode 282 can be made substantially invisible or only faintly visible to the human eye so that the barcode 282 does not detract from the appearance of the hardcopy document 280 or reduce the area of the hardcopy 280 that is for normal use (i.e. for printing, writing or drawing on).

A further embodiment of the invention employs a dot pattern 12, barcode 282 or some other identifying pattern which fluoresces. In this case the digital pen 20 or some other reader detects the fluorescence as a means to identify the documents. The fluorescence may be produced by a light source in the pen (or other reader) or it may be produced by ambient light.

Figure 30:
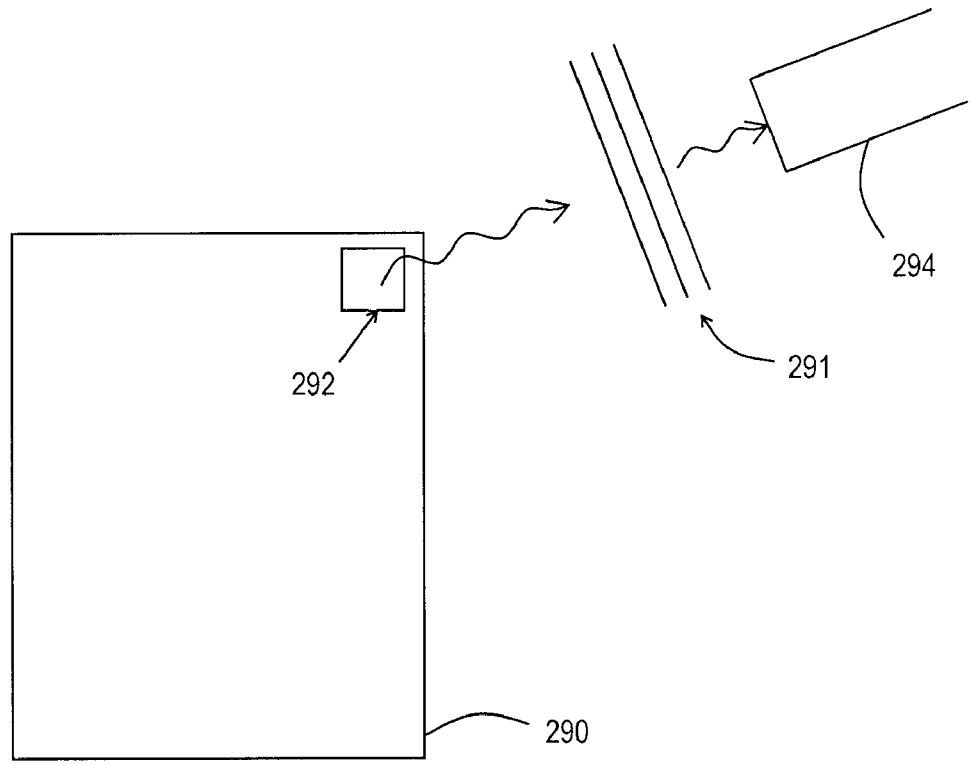
FIG. 30 shows schematically a hardcopy document that has a radio frequency tag.

FIG. 30 illustrates a hardcopy document 290 that has a radio frequency (RF) tag 292. The RF tag 292 emits radio frequency electromagnetic waves that are either amplitude modulated or frequency modulated (or both) to encode information in the wave. The RF tag 292 emits RF waves that have information that identifies the hardcopy document 290. The RF wave can be picked up by a reader 294 that may be some distance from the tag.

The RF tag 292 may be a so-called "passive" RF tags. Passive RF tags are powered by a field generated by the reader 294. Alternatively, the RF tag 292 may be a so-called "active" RF tag. Active RF tags are powered by an internal battery. Active RF tags are larger and more expensive than passive tags but emit more powerful RF waves. Current technology allows the RF wave to be read up to a 1,000 meters from the RF tag 290 but for the purposes of this embodiment of the invention it would be only necessary to read the RF wave a distance of say a few millimetres to a few centimetres from the RF tag 290—in this case the RF tag 290 would only need to be a weak emitter of RF waves and a passive RF tag would be sufficient for this purpose.

The RF waves emitted by the passive RF tag 292 are easily able to penetrate paper documents having a thickness of several centimetres. The reader 294 may be placed above a stack 296 of hardcopy documents to read all the identification information from the documents in the stack. The reader 294 is then able to send this information to the PC 104 so that the software can associate the electronic versions of the documents in the stack. There are known techniques to deconvolute the RF signals emitted from several sources, therefore, it is not necessary for the RF tags 292 of the different documents to have different positions on the page.

FIG. 31 illustrates a hardcopy of which a page (or pages) has an identifying pattern 302 which has be made in the form of light scattering centres which may take the form of, for example, perforations 304, indentations 306 or protrusions 308. Incident light 301 that encounters the light scattering centres will produced scattered light 303. A light detector placed over the page will receive a lower light intensity from the scattered light than from otherwise reflected light, this enables the identifying pattern 302 to be read. The light scattering centres may be read by a reader which is similar to the digital pen 20. That is the reader directs light, such as infrared or visible light, onto the pattern 302 and uses a camera 32 to receive light coming from the page.

The perforations 304 indentations 306 or protrusions 308 may also be read by tracing a stylus 310 or a plurality of styluses across the identifying pattern 302. The stylus 310 has a sensor (not shown) that follows the motion of the sylus over the identifying pattern and sends the identifying information encoded in the pattern to the PC 104. This system could be thought of as electronic Braille. A further way of position-sensing which uses a pattern on the page, but not an optical image capture of the pattern, is to use a position-determining pattern printed on the page with electrically conductive ink and to sense the conductivity of the surface of the page to decode the pattern, or bar-code.

Figure 32:
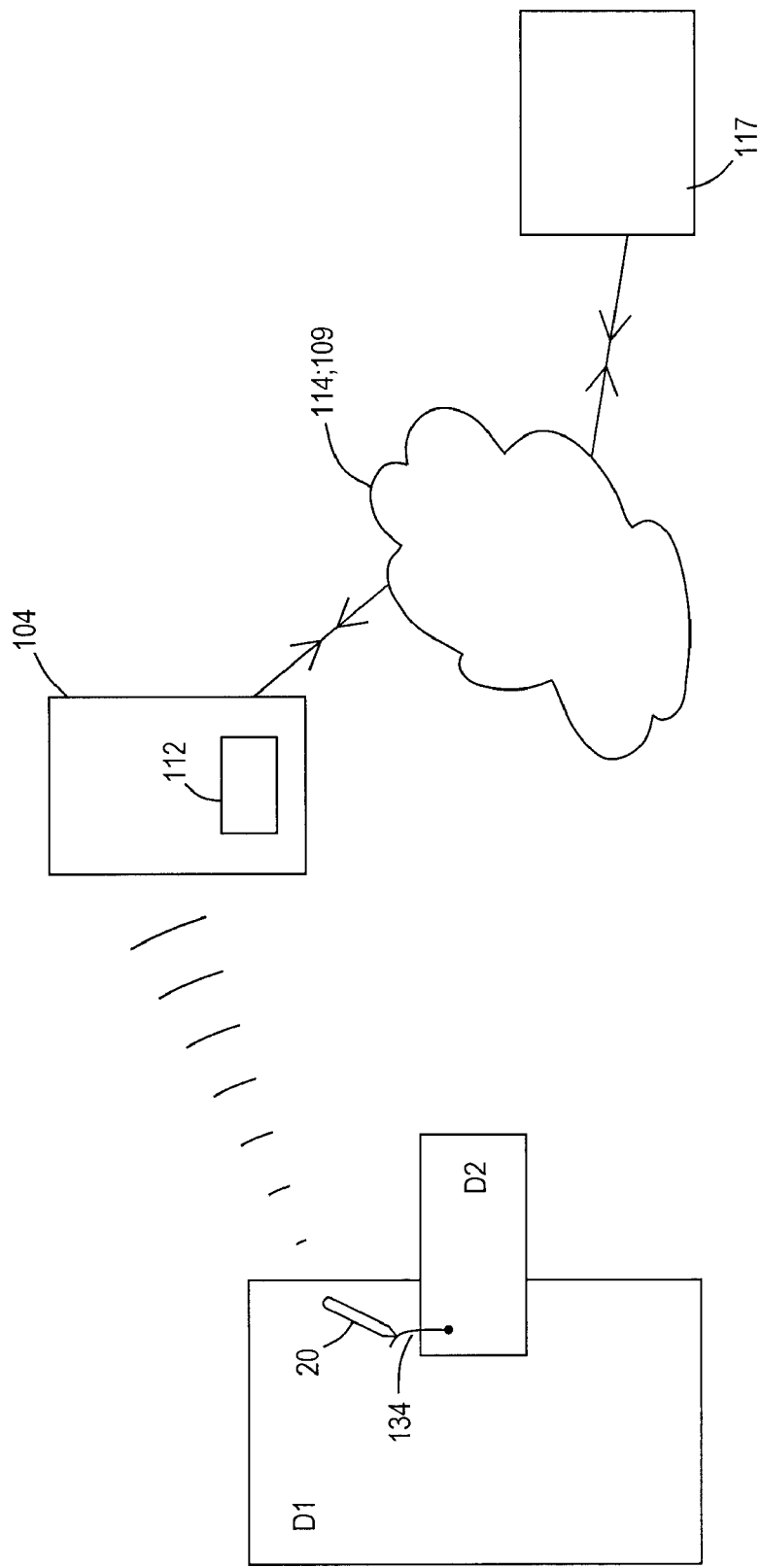
FIG. 32 shows schematically a system for associating two electronic documents, at least one of the which is retrieved from a remote memory.

FIG. 32 illustrates two hardcopy documents D1 and D2. Hardcopy document D2 may be, for example, a notelet on which a user writes (or makes other markings) by making pen strokes with a digital pen 20, or it may be a sheet of A4 paper, or a plurality of sheets of A4 paper. The digital pen 20 transmits the pen strokes to a PC 104 and software running on the PC creates an electronic version of D2 (which includes representations of the writing or other markings). The electronic version of D2 is stored, for example, in the PC memory 112. In this embodiment an electronic version of D1 already exists. The user then uses the pen 20 to make a link mark 134 on the hardcopy documents D1 and D2. The link mark 134 provides the PC 104 with pattern data that identifies D1 and D2 so that the software is able to link the electronic versions of D1 and D2. If there is no electronic version of D1 stored in the PC memory 112, the PC 104 uses the identification of the electronic version of D1 to search for the electronic version of D1 in locations that are remote to the PC 104. For example the electronic version of D1 may be stored in a document memory 117 in a remote server or personal computer that is connected to the user's PC 104 via the Internet, a LAN, a WAN or a MAN. The PC 104 then retrieves the electronic version of D1, or a copy of it, from the document memory 117 and stores it in the PC memory 112. In this way the PC 104 is able to associate the electronic versions of D1 and D2 when the PC 104 originally had no copy of, or even a record of, the electronic version of D1. In a variation of this technique electronic versions of both documents D1 and D2 already exist (i.e. it is not necessary to first create an electronic version of either document) and the PC 104 retrieves one or both of these electronic versions from a remote memory 117 in response to link marks(s) on the hardcopy of documents D1 and D2.

Embodiments of the invention have been described in which a combined electronic document has been automatically created by making link mark(s) 134 on the hardcopies of individual documents. The combined electronic document has the content of the individual documents or sections of the content of the individual documents as defined by editing marks made with the digital pen 20 on the hardcopy documents. In a further embodiment of the invention a user makes a link mark 134 to link a secondary document, e.g. a notelet, to a primary document but in this case a combined document is not automatically produced. Instead, the user may be presented with a display with a representation of the primary document with a tag or other icon representing the secondary document. The secondary document is only presented to the user when the user selects the icon, for example with the keyboard 106 or the mouse 108. Alternatively, when the user selects the icon the user is presented with a combined document that has the content of the both the primary and secondary documents or sections of the content of the primary and secondary documents as defined by editing marks made with the digital pen 20.

In this technique there is no need to store an electronic version of the secondary electronic document or the combined document. The secondary electronic document or the combined document is only displayed when it is required by the user. For example the secondary document may be stored in a remote memory (e.g., a memory connected to the user's PC 104 via the Internet, LAN, WAN or MAN) and the secondary document is only retrieved, or combined document created, when the user wants to view it. The user may send an email containing the electronic version of the primary document together with the icon. A recipient of the email may then select the icon as and when the recipient wishes to view the document represented by the icon. The electronic version of the primary document together with the icon will have a file size that is only marginally larger than the file size of the electronic version of the primary document that does not have the icon. Therefore, the process of sending the email will use less of the bandwidth available for email communication than would an email of the combined document.

Preferably, the icon displays information, for example a file name, which identifies the electronic document that will be displayed when the icon is selected.

Thus, the linking or association of electronic files may be made by the copying of data from one file into the other file to produce a larger file that has data from both files stored in memory. Alternatively, the linking or association between two electronic files may comprise having a pointer to the second file, or to part of the second file, present in the first file so that when a user calls the linked or associated file up for display they get displayed data from the first file and data from the second file (this may be automatic, without the need for a user to take any further action, such as click on a link icon).

In some embodiments the invention may be considered to comprise digital pen (or other hand-manipulated device) mediated association, incorporation, or linking of different electronic files.

Although embodiments of the invention have been described with reference to particular documents, for example an agenda and a set of minutes, this has been for illustrative purposes only—the content of the documents is not relevant to the applicability of the invention to many embodiments.

It will be readily apparent that the skilled person can derive further embodiments of the invention by combining features of the embodiments herein described.

It will be appreciated that the term "pen" should, in some of its uses in this document, be given a wide interpretation. In many embodiments the "pen" is something elongate, that can be held in one hand and manipulated between fingers and thumb in a similar way to a normal pen, but which can read or acquire code signals from a physical paper identifier. It may well have a writing nib or stylus to enable it to make marks on the physical paper identifier, but it may not. In some embodiments the "pen" could be considered to be a "code reader", and may not be much like a true pen. For example, the "pen" could take the form of an electronic device that looks like a computer mouse (flat bottom, about palm of the hand sized), and which has a reader, but no writer/writing stylus or nib. The reader is often an optical sensor or image capturer, such as a camera, but it need not necessarily be so. The pen may have a display to display the first and/or second electronic documents, and/or to display the combined, associated electronic document. The processor that associates electronic documents may be on-pen or off-pen, remote from the pen. The memory accessed by the processor may be on-pen or off-pen.

Figure 33:
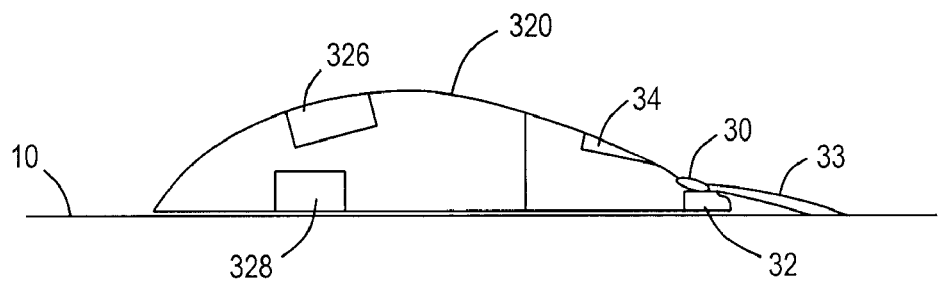
FIG. 33 shows schematically a side view of a mouse adapted for reading coding from a hardcopy document.
Figure 34:
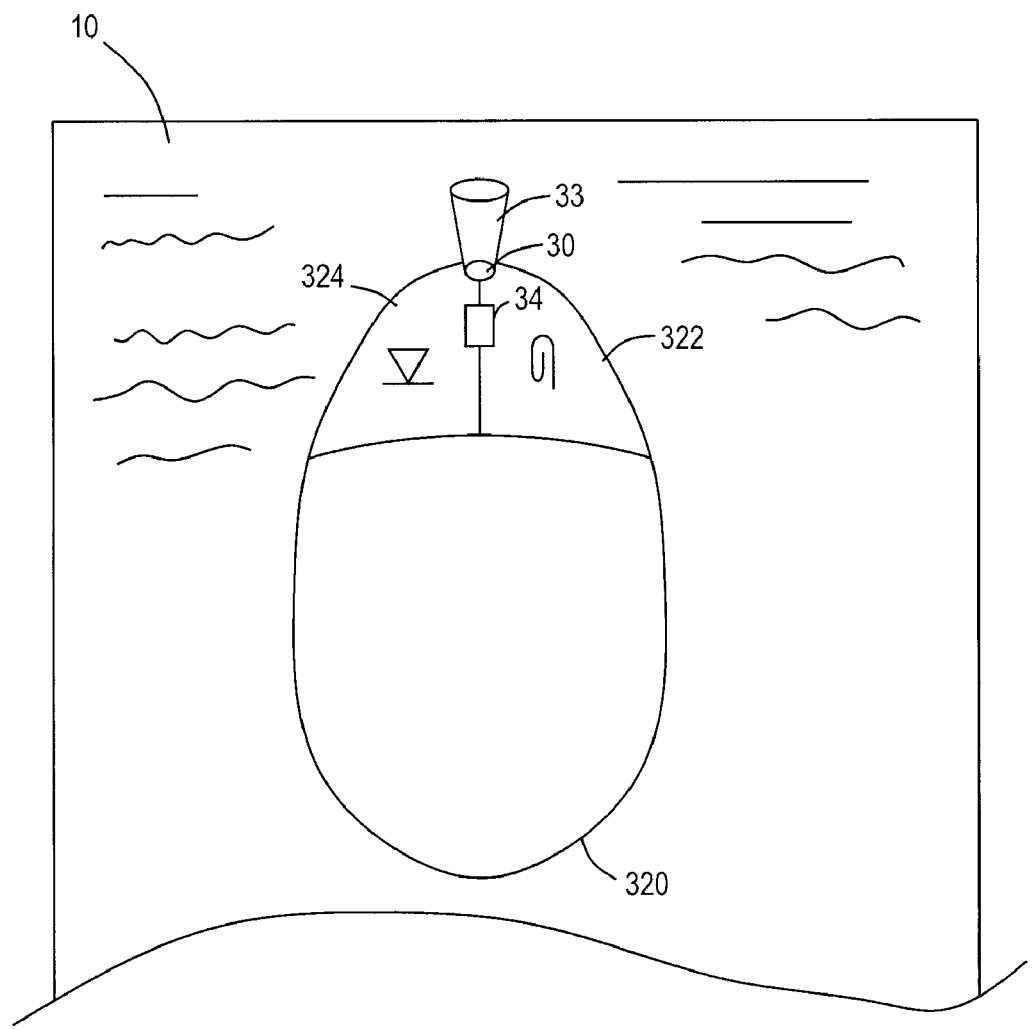
FIG. 34 shows schematically a plan view of the mouse illustrated in FIG. 33.

Referring to FIGS. 33 and 34, in an embodiment of the invention the pen may be in a form that takes the appearance, generally, of a conventional computer mouse. The mouse 320 has a LED 30 and a camera 32 that function to read a pattern from digital paper 10 in the same manner as described with reference to other embodiments of the invention. The data acquired by the camera 32 is transmitted by a wireless telecommunications transmitter 34 (e.g. to a receiver linked to a PC). As with other embodiments, the digital paper 10 contains content corresponding to an electronic document, that is, the digital paper is a hardcopy of the electronic document and contains machine-readable coding, such as a dot pattern 12, which identifies the electronic document.

The LED 30 and camera 32 are disposed on the periphery of the mouse 320 near to the surface of the mouse 320 which, in use, is closest to the digital paper 10 such that the beam of light 33 produced by the LED 20 irradiates an appropriately sized area of the paper 10 and the reflected light received by the camera 32 from the paper 10 has sufficient intensity for the camera to be able to read the dot pattern 12. Although the mouse 320 would be easier to manipulate if it is in contact with the paper 10 this is not essential for the functioning of the mouse 320. A conventional computer mouse will generally have a 'roller ball' as a means of sensing relative movement of the mouse. However, this feature is not necessary for the mouse 320 of this embodiment of the invention—the absolute position of the mouse 320 on the digital paper 10 is determined by reading the dot pattern 12 from the paper 10—it is therefore not necessary to monitor the relative movement of the mouse 320 (although this could be an additional feature of the mouse 320).

The mouse 320 is provided with one or more buttons 322, 324 or other activation means (e.g. a touch sensitive screen) which when activated causes the mouse 320 to communicates a signal to a computer 104 which then acts on the electronic document. Alternatively, activation of a button 322, 324, may cause an instruction to be processed and/or stored on a processor and/or memory in the mouse 320, the instruction or processed instruction may then be communicated to the computer 104 so that the computer 104 acts on the electronic document.

In one example a button 322 is provided that allows a user to link two electronic documents by clicking the button 322 (once or more than once) when the mouse 320 is placed over a hardcopy of a first electronic document and then clicking the button 322 (once or more than once) when the mouse is placed over a hardcopy of a second electronic document. Of course many electronic documents may be associated using this technique. This button 322 may display a paper dip icon to indicate its function to a user.

It will be appreciated that in some of its uses in this document the term "physical paper identifier" should be given a broad interpretation. In many embodiments it is a sheet of paper or other thin flexible sheet (e.g. plastics sheet, plastics laminated paper, cardboard, polymer film, metal or metallised sheet, etc.). However, it could be considered to be simply a "code-carrying" surface, or a "physical identifier"—for example whilst many physical identifiers of an electronic (digital) memory document or electronic (digital) memory space are flexible, some may be rigid, and some may not be sheet-like.

It will be appreciated that an electronic document, e.g. a first or second electronic document within the meaning of the claims, may itself be part of a larger electronic document (e.g. a paragraph or two from a larger document).

Content of a document (electronic or physical, e.g. paper), in many embodiments is human discernable (when displayed in the case of electronic documents) and may typically be text, but it could be, or include, photographs, graphics, non-text content. The display of the content of an electronic document to present/display its human-discernable content to user could be displaying it on a screen of an electronic device, printing it, for example in paper, projecting it onto a surface, or any suitable way of allowing a human to use their senses to determine the content.

The invention claimed is:

1. A method of associating a first electronic document with a second electronic document comprising:
   having a first physical paper identifier having a device readable coding, which codes for an identifier for said first electronic document, and;
   reading said coding of said first electronic document with a device, to acquire information enabling said identity of said first electronic document to be established, and;
   communicating that identity to a computer processor, and;
   detecting a user gesture associating the identified first electronic document with the second electronic document, wherein the user gesture includes a user linking marker gesture performed with the device on at least a portion of a hardcopy of the identified first electronic document and on at least a portion of a hardcopy of the second electronic document; and
   using said processor to associate said identified first electronic document with said second electronic document in response to the detected user gesture, wherein the associating includes the processor interpreting the user gesture on the hardcopies as instructions to link the first and second electronic documents.

2. A method according to claim 1, wherein said device is a digital pen.

3. A method according to claim 1 wherein said device is used to read a second physical paper identifier coding for said second electronic document and to communicate to said processor information enabling said identity of said second electronic document to be established.

4. A method according to claim 3 wherein said first physical paper identifier comprises a first sheet of digital paper having a device readable position-determining pattern and having human readable content; said second physical paper identifier comprises one or more sheets of digital paper having a device readable position-determining pattern.

5. A method according to claim 1 wherein said device is used to create at least some human discernable content of at least one of said first and second electronic documents.

6. A method according to claim 1 wherein at least one of said first and said second physical identifier comprises a printed and/or digital pen-written paper document having human discernable content equivalent to at least part of the respective one of said first and second electronic documents, the printed document being one or more of the hardcopies.

7. A method according to claim 6 wherein at least one of said first and second documents and said equivalent one of said first and second electronic documents whose identity is coded for by their device-readable coding have substantially the same human readable content as each other.

8. A method according to claim 7 wherein at least one of said first and second physical paper document and their equivalent electronic documents present substantially identical representatives of their human readable content to a user, at least one of said electronic documents faithfully replicating a paper document created at least in part by a user making markings with said device, on digital paper, comprising at least one of said paper documents.

9. A method according claim 1 in which said physical paper identifier has a device position determining pattern on it to enable said device, to acquire data to enable said position of said pen, or device, on said paper to be determined, and to enable device movements on said paper to be represented in an equivalent digital document.

10. A method according to claim 9 wherein a link is caused to be established between said first electronic document and said second electronic document by one of:
(i) making one of a specific predetermined action, gesture and mark with said device on at least one of said first physical paper identifier and a second physical paper identifier which has a device-readable code coding for said second electronic document;
(ii) making one of a non-specific undefined action, gesture and mark with said device on at least one of said first physical paper identifier and a second physical paper identifier which has a pen-readable, device-readable code coding for said first or second electronic document; and
(iii) making a non-specified mark with said device by one of (a) placing device in contact with said first physical paper identifier and moving said device from said first physical paper identifier to a second physical paper identifier which has a device-readable code coding for said second electronic document, and (b) placing said pen or device in contact with said second physical paper identifier and moving said device from said second physical paper identifier to said first physical paper identifier, wherein device exerts downwards pressure, throughout said pen stroke or device movement producing said mark.

11. A method according to claim 1 wherein said physical paper identifiers include a physical paper print-out of at least one of said electronic documents identified by said paper identifier.

12. A method according to claim 1 comprising a user:
(i) writing at least one of notes and sketches on notelets comprising a plurality of first sheets of paper, comprising first physical paper identifiers, using a device to create content on said first sheets, and to create a plurality of first electronic documents equivalent to said notelet content;
(ii) positioning said plurality of notelets on second sheets of paper, comprising second physical paper identifiers, at places where it is desired for said content of said first sheets of paper to be reproduced in a representation of an electronic combined document formed from an electronic document equivalent to and identified by said second sheets and from said first electronic documents created by said device upon said notelets;
(iii) using said device to make one of link actions, marks and gestures on each notelet and said adjacent area on said second document so as to link said plurality of first electronic documents with said second electronic document to create a combined electronic document such that said notelet contents appear to a user viewing said combined electronic document at said positions where said one of link actions, marks and gestures are made.

13. A method according to claim 1 wherein said user gesture comprises writing a line, and or making a device gesture of writing the line, that extends from one the hardcopies to the other hardcopy.

14. A method according to claim 1 wherein said coding comprises at least one of:
(i) a pattern of markings from which a page identity can be established;
(ii) a pattern of markings from which a position in a marking pattern can be established;
(iii) a radio frequency marker; (iv) an ultraviolet marker;
(v) a marker detectable at an electromagnetic wave spectrum that penetrates paper well.

15. A method according to claim 1 wherein said second electronic document is associated with said electronic document in a manner such that when a combined, associated, electronic document, comprising said first and second electronic documents, is displayed said first and second electronic documents are presented to a user as separate identifiable documents each retaining their integrity unadulterated by said other.

16. A method according to claim 15 wherein said combined electronic document when displayed to a user presents said first and second documents in a manner from said group:
(i) one after the other, as equivalent paper pages containing said content of said electronic documents had as if said paper pages been stacked on top of each other;
(ii) as options in a user-selectable menu, with options relating to at least one of said first, said second and said combined electronic documents being visible to said user at the time they select.

17. A method according to claim 1 wherein said processor has locally available memory and access to a communications link to a remote memory resource, and wherein pursuant to identification of said first electronic document said processor establishes whether or not said first electronic document exists in said locally available memory and if it does not said processor communicates via said communications link with said remote memory resource to cause one of said first electronic document, and a copy of said first electronic document, to be transferred to said locally available memory.

18. A method according to claim 17 wherein said communications link comprises at least one of:
   a LAN;
   a WAN;
   a MAN; the internet.

19. A method according to claim 1 wherein said first physical identifier comprises a sheet of paper having a position determining pattern readable by said device to enable data relating to device movements made upon said sheet to be captured, and wherein an association between said second electronic document and said first electronic document is established using data acquired by said device to establish said identity of said sheet of paper, and wherein said association is made by one of:
   (i) after a user has finished moving said device over said paper, or finished writing upon or marking said sheet of paper with said pen; and
   (ii) when said device recognises said identity of said sheet of paper.

20. A method according to claim 19 wherein there is a first electronic document file in a first computer memory file, and a second electronic document in a second computer memory file, and wherein there is an association made associating said first and second files by a computer processor, said association being one of: (a) before, a user moves said device over said sheet of paper, or writes or marks said sheet of paper with said device to populate said first file with data; (b) during a user moving said device over said sheet of paper, or writes or marks said sheet of paper with said device to populate said first file with data; and
   (c) after a user moves said device over said sheet of paper, or writes or marks said sheet of paper with said device to populate said first file with data.

21. A method according to claim 1, further comprising:
   generating a single identifier identifying the linked first and second electronic documents;
   receiving a user selection of the single identifier; and
   presenting the linked first and second electronic documents in response to receiving the user selection of the single identifier.

22. A system for presenting to a user a visual representation of a combined document including at least some user readable content from a first paper document and at least some user readable content from a second paper document, said system comprising:
   a digital document linking device, said device having a position determining device adapted to acquire information to enable said position of said device to be determined, said position determining device being one of a position determining sensor and a camera;
   a first paper sheet having a first device-readable pattern to enable said device to acquire information from said first paper sheet to enable said position of said device in said first pattern to be determined;
   a second paper sheet comprising a paper document having a second device readable pattern to enable said device to acquire information from said second paper sheet to enable said position of said device in said second pattern to be determined, and there being an electronic equivalent document equivalent to said content of said second paper sheet;
   a computer processor adapted to process signals from said device;
   a communications link adapted to communicate said pen or device with said processor to enable said signals to be communicated to said processor, said signals including device acquired data capable of enabling said position of said device in said patterns to be identified;
and wherein:
   said processor has software which when run is adapted to:
   identify said second electronic document equivalent to said content of said second document using second pattern-related data acquired by said device:
   to create a first electronic document representative of user-applied device movements, made on said first paper sheet when said user creates a first, written paper document on said first paper sheet;
   to interpret data derived from device movements performed by said user on said first and second paper sheets as linking instructions to create a link between said second electronic document and said first electronic document so as to enable a visual representation to be produced of said second paper document with said device created first paper document associated with it; and
   to act on said linking instructions so as to cause said first and second electronic documents to be so linked.

23. A system according to claim 22 wherein said document linking device is a pen.

24. A system according to claim 22 wherein said software is adapted to interpret a linking action made with said device by said user that is made on a selected part of said second document and a selected part of said first sheet as instructions to create a visual representation derived from said first and second electronic documents with said selected parts aligned in said visual representation.

25. A system according to claim 22 wherein said software is adapted to cause a third electronic document to be produced and stored in processor-accessible memory, said third electronic document comprising data obtained from said first and second electronic documents.

26. A system according to claim 22 wherein said software is adapted to cause a set of instructions to be produced which, when a user requests said production of said visual representation of said combined electronic document, references data from said first and second electronic documents to create said visual representation of said combined document.

27. A system for presenting to a user a visual representation of a combined document including at least some user readable content from a first paper document and at least some user readable content from a second paper document, said system comprising:
   reading means for reading a first and second device-readable position-determining patterns on said first and second paper documents respectively to identify said position of said reading means on said paper documents, said reading means having a lighting means adapted to shine light onto said paper documents, a light receiving means adapted to receive light from said lighting means that has been reflected off said paper documents so as to acquire information to enable said position of said writing means on said paper documents to be determined, and a pressure sensing means, said reading means being adapted to acquire said information and determine when said pressure sensing means senses a reading pressure applied to said documents by reading means;
   a processing means adapted to process signals from said reading means;
   a communication means adapted to communicate said reading means with said processor to enable said signals to be communicated to said processing means, said signals including device-acquired data capable of enabling said position of said device in said patterns to be identified;

an electronic equivalent to said user readable content of said second paper document, said electronic equivalent document being stored in memory accessible by said processor;

and wherein:

said processing means has software means which when run is adapted to:

identify said second electronic document equivalent to said content of said second document using second pattern-related data acquired by said device:

create a first electronic document representative of user-applied device movements made by said reading means on said first paper sheet when said user creates a first, written, paper document on said first paper sheet;

to interpret data derived from movements made by said user on said first and second paper documents using said reading means as linking instructions to create a link between said second electronic document and said first electronic document so as to enable a visual representation to be produced of said second paper document with said device-created first paper document associated with it; and to act on said linking instructions so as to cause said first and second electronic documents to be so linked.

28. A software for associating a first electronic document with a second electronic document, wherein a first physical paper identifier having device-readable coding codes for an identifier for said first electronic document, said software when run on a computer system performing a method comprising:

reading said coding of said first electronic document with a device, to acquire information enabling said identity of said first electronic document to be established, and;

communicating that identity to a computer processor, and;

detecting a user gesture associating the identified first electronic document with the second electronic document, wherein the user gesture includes a user linking marker gesture performed with the device on at least a portion of a hardcopy of the identified first electronic document and on at least a portion of a hardcopy of the second electronic document; and using said processor to associate said identified first electronic document with said second electronic document in response to the detected user gesture, wherein the associating includes the processor interpreting the user gesture on the hardcopies as instructions to link the first and second electronic documents.

* * * * *